United States Patent
Lankford et al.

(10) Patent No.: US 8,161,168 B2
(45) Date of Patent: Apr. 17, 2012

(54) JMS PROVIDER WITH PLUG-ABLE BUSINESS LOGIC

(75) Inventors: Peter Lankford, Chicago, IL (US); Andrew MacGaffey, Carol Stream, IL (US)

(73) Assignee: Metafluent, LLC, Warrenville, IL (US)

( * ) Notice: Subject to any disclaimer, the term of this patent is extended or adjusted under 35 U.S.C. 154(b) by 595 days.

(21) Appl. No.: 12/225,218

(22) PCT Filed: Mar. 14, 2007

(86) PCT No.: PCT/US2007/006500
§ 371 (c)(1),
(2), (4) Date: Sep. 15, 2008

(87) PCT Pub. No.: WO2007/109086
PCT Pub. Date: Sep. 27, 2007

(65) Prior Publication Data
US 2009/0313338 A1   Dec. 17, 2009

Related U.S. Application Data

(60) Provisional application No. 60/783,369, filed on Mar. 18, 2006.

(51) Int. Cl.
*G06F 15/16* (2006.01)
(52) U.S. Cl. ........................ 709/227; 709/203
(58) Field of Classification Search ................. None
See application file for complete search history.

(56) References Cited

U.S. PATENT DOCUMENTS

| | | | |
|---|---|---|---|
| 6,401,121 B1 | 6/2002 | Yoshida et al. | |
| 6,633,914 B1* | 10/2003 | Bayeh et al. | 709/227 |
| 6,671,259 B1 | 12/2003 | He et al. | |
| 6,965,938 B1 | 11/2005 | Beasley et al. | |
| 7,181,731 B2 | 2/2007 | Pace et al. | |
| 7,200,675 B2* | 4/2007 | Wang et al. | 709/238 |
| 7,403,993 B2 | 7/2008 | John et al. | |
| 7,454,492 B2* | 11/2008 | Bauer et al. | 709/223 |
| 7,487,513 B1* | 2/2009 | Savchenko et al. | 719/320 |
| 7,512,686 B2 | 3/2009 | Berg | |
| 7,546,369 B2 | 6/2009 | Berg | |
| 7,620,687 B2 | 11/2009 | Chen | |
| 7,649,876 B2 | 1/2010 | Berg | |
| 7,698,398 B1* | 4/2010 | Lai | 709/223 |
| 7,702,739 B1* | 4/2010 | Cheng et al. | 709/207 |
| 7,747,678 B2* | 6/2010 | Mehra et al. | 709/203 |
| 7,814,470 B2 | 10/2010 | Mamou et al. | |
| 7,831,693 B2* | 11/2010 | Lai | 709/220 |
| 2001/0016880 A1* | 8/2001 | Cai et al. | 709/321 |
| 2002/0004848 A1* | 1/2002 | Sudarshan et al. | 709/310 |
| 2002/0154646 A1 | 10/2002 | Dubois et al. | |
| 2003/0014554 A1* | 1/2003 | Williamson et al. | 709/313 |
| 2003/0018694 A1 | 1/2003 | Chen et al. | |

(Continued)

OTHER PUBLICATIONS

Andersson et al., "FIX Adapted for Streaming (FAST Protocol) Field Encoding Specification", Jan. 11, 2006, Version 1.0.*

*Primary Examiner* — Larry Donaghue
(74) *Attorney, Agent, or Firm* — Squire Sanders (US) LLP

(57) ABSTRACT

The invention provides plug-in framework, enabling embedding of content-based processes to in a messaging paradigm provider service. In the preferred embodiment, the messaging paradigm is JMS and the invention provides a plug-able framework embedded in a JMS Provider. The plug-able server is particularly suited for efficient and secure transmission of real-time, streaming data.

33 Claims, 20 Drawing Sheets

U.S. PATENT DOCUMENTS

| | | |
|---|---|---|
| 2003/0093470 A1 | 5/2003 | Upton |
| 2003/0105797 A1 | 6/2003 | Dolev et al. |
| 2003/0229900 A1 | 12/2003 | Reisman |
| 2004/0122892 A1* | 6/2004 | Brittenham et al. .......... 709/203 |
| 2004/0221261 A1* | 11/2004 | Blevins ........................ 717/107 |
| 2005/0228808 A1 | 10/2005 | Mamou et al. |
| 2006/0047751 A1 | 3/2006 | Chen et al. |
| 2006/0069717 A1 | 3/2006 | Mamou et al. |
| 2006/0123425 A1 | 6/2006 | Ramarao et al. |
| 2006/0129684 A1 | 6/2006 | Datta |
| 2006/0277413 A1 | 12/2006 | Drews |
| 2007/0043834 A1* | 2/2007 | Banerjee ...................... 709/219 |
| 2007/0086360 A1 | 4/2007 | Berg |
| 2007/0124362 A1* | 5/2007 | Kren ............................ 709/202 |
| 2007/0191033 A1* | 8/2007 | Marais ........................ 455/466 |
| 2009/0070489 A1 | 3/2009 | Lu et al. |
| 2009/0282149 A1 | 11/2009 | Kumbalimutt et al. |
| 2010/0070650 A1* | 3/2010 | MacGaffey et al. .......... 709/238 |

* cited by examiner

1701 Step 1 Client requests [Server] permission to publish/subscribe to Destination 1702 Step 2 Server determines
        a) permission and
        b) eligibility of Destination for Optimization 1703 Step 3 If not eligible: then Client transmits message to Server w/o optimization; if eligible, go to step 4.

1704 Step 4 Message is optimized by the sub steps of:

a) Server determines that Client has Destination Specific Dictionary [DSD]
b) Server sends DSD to Client Session;
c) Client saves Destination specific dictionary for session-life
d) Server sends reference to DSD for Destination
e) Client uses reference to associate DSD with Destination
f) Server sends message to Client using coding implied by dictionary as appropriate to DSD for the particular Destination
g) Client interprets Server message using meta-data from DSD;
h) Client represents meta-data message to JMS API as MapMessageObjects;
i) Client transmits optimized message to Server; and
j) Sever may send Client a new DSD followed y a reference to that DSD for some Destination.

JMS PROVIDER WITH PLUG-ABLE BUSINESS LOGIC

RELATED APPLICATIONS

This application claims priority from U.S. provisional application 60/783,369 of the same title and by the same inventors, filed Mar. 18, 2006, the entirety of which is incorporated by reference as if fully set forth herein.

BACKGROUND

1. Field of the Invention

The invention generally relates to the field of streaming data over a network and more specifically, the automating of business processes driven by real-time information.

2. Description of Related Art

Many integration systems for streaming and static data over a computer network or over the Internet exist already. Approaches may be found within several areas of integration middleware: extract/transform/load (ETL), enterprise application integration (EAI), enterprise information integration (EII), and domain-specific middleware like a financial market-data system or RFID middleware.

In the last decade, client server systems for static data integration have increasingly favored locating logic, to the extent possible, on the server rather than the client. Loading logic on the server lowers costs, shortens time to market, and reduces long-term risks. Integration vendors have continued this trend by introducing products that perform more integration on application servers and leave less to developers of client applications.

Current data integration systems do not provide for streaming data the same quality available for static data, nor for system integration of mixtures of streaming and static. Currently available integration products for streaming data force application developers to implement a great deal of logic related to content acquisition and transformation. This logic implementation costs application developers a great deal of time and money in both the short and long term. Moreover, to the extent that some streaming data integration products try to simplify the developer's task, such simplification is achieved by putting logic into the API (Application Programming Interface). However, putting logic in the API forces developers to use proprietary APIs and proprietary APIs become harder to maintain on a variety of platforms as the APIs evolve to incorporate more business logic.

What is needed is a flexible way for an integration system to acquire, transform, and distribute streaming data, as well as a means for the integration system to support standards (e.g. Java Message Service (JMS)). What is also needed is a means to shift the burden of content-integration from the client-side application to the server infrastructure.

Financial services firms have information intensive business processes that consume information from a large variety of sources, both internal and external. Much of the data they consume is related to activity in the financial markets and therefore updates continuously while the markets are open. These firms also generate information and distribute it within their enterprise and with external business partners.

A major financial services firm will develop hundreds or thousands of different software applications that consume, manipulate and perhaps publish data from one or more data sources. Each of these applications is designed to perform some specific business function ranging from graphical display for users to fully automated algorithmic trading.

Financial services application are typically complex, by virtue of interaction with multiple streaming and static data sources, as well as the rapid update of continually changing information. A large-scale application, for example, may consume data relating to hundreds of thousands of different financial instruments and absorb tens or hundreds of thousands of updates per second. Currently, proprietary technology (data integration systems) meets the specialized need of the industry, requiring high development costs; poor integration of the proprietary with the larger mainstream is a chronic problem.

Financial services firms must constantly improve their ability to exploit market place opportunity to remain competitive. Streaming data integration is critical. The ability of developers to rapidly provide new software to serve a particular business need is a vital aspect of preserving productivity and shortening time to market. What is needed is a system and method for integration of streaming data that provides data virtualization, flexible transformation, customer-controlled (as opposed to vendor dictated or "proprietary") data models, and standards-based interfaces. Further needed are a method and system capable of simultaneously integrating multiple, disparate data sources, both streaming and static, as well as executing high-through-put, low latency deployment of data to subscribers (clients applications), inter-application messaging and transactional messaging. And a data integration system providing dynamic tailorability of subscription permissions and improved resource allocation in service of deployment are needed.

SUMMARY OF INVENTION

The invention provides computer implementable methods, via hardware or software, comprising a plug-in server framework. The inventive plug-in framework supports different implementations of JMS functionality (e.g. "normal" JMS functions such as inter-application messaging with transactional capabilities and also the gateway-type functionality provided by many JMS Providers that give access to other middleware). The inventive framework further supports embedding of domain specific business logic or messaging implementations into the server, e.g. in the market-data domain, market data subscription management, and content-based permissioning.

The preferred embodiment includes a JMS Provider (JMSP) implementation comprised of a JMS client library and a supporting Server application that supports plug-in implementations of the JMS messaging paradigm, as well as mechanisms that allocate and manage connections and sessions with JMS clients, and which activate the appropriate plug-in when a topic or queue is requested, according to the namespace mappings that have been configured.

The preferred embodiment further provides interfaces that define the abstractions to be implemented by each plug-in, e.g. factories, destinations, subscribers, and publishers.

An implementation of the inventive protocol uses many fewer bytes than the commonly used protocols used to support JMS MapMessage. By sending field name and type information as needed, once only, rather than in each message, the inventive method reduces the resources required to process messages on both the JMS Provider server and on the JMS client, reduces the network bandwidth required and also the CPU utilization to allocate and reclaim the memory used for storing the field names.

The invention further provides a plug-in that implements the "standard" JMS messaging behavior, as described in the JMS API specification, as well as a plug-in that provides JMS topic-based publish-subscribe applications with access to real-time streaming content and that utilizes an optimized MapMessage protocol as described above.

The invention according to the preferred embodiment provides a series of plug-ins, including but not limited to: a plug-in that implements a bidirectional "gateway" to TIBCO Rendezvous messaging; a plug-in that implements a bi-directional gateway to other JMS providers; a plug-in that provides a bi-directional gateway to subscriptions for Reuters Market Data System. The invention according to the preferred embodiment further provides a plug-in that accomplishes load-balancing based on the topic or queue namespace as well as a plug-in that provides load-balancing based on server load.

Subscription management. A specific example of the benefits of embedding business logic in the server is in subscription management. The invention provides the ability to embed a content provider into the server that can then efficiently manage the life-cycle of streaming real-time content subscriptions. In order to conserve total system resources, publishers of high-volume streaming data typically strive to publish only the data that subscribers have specifically requested and to stop publishing when there are no longer any subscribers for the data.

Implementing this principle using a previous JMSP requires business logic to be layered on top of JMS. Logic is required to notify publishers when downstream users are interested in a particular topic (meaning that the publisher should start publishing that topic) and when all users have stopped subscribing to the topic (so that the publisher should stop publishing to the topic). This was accomplished by creating topics to which subscribers publish and publishers subscribe, in order to communicate that the subscriber has started subscribing. It also required "heartbeat" topics, on which subscribers send periodic messages to publishers ensuring them that they are still actively watching the data topic to which they have subscribed, and preventing the situation where a subscriber exits without "unsubscribing" to a topic and the publisher believes the subscriber remains active forever.

The invention taught herein enables the JMS Provider to internalize this sort of subscription management logic, thereby relieving publishers and subscribers of this burden. This greatly simplifies the total system and vastly improves its efficiency. Through use of a Managed Content Plug-in that publishes content (rather than requiring a publisher to use the JMS publishing interface), the JMS Providers can use information about which subscribers have subscribed to which topics in order to start and stop publishing, as appropriate, thereby most efficiently using resources within the JMS Provider itself as well in other deFApendent systems.

Application Context. The invention provides Application Contexts that are specific to a given type of application, thereby overcoming some disadvantages of traditional JMS Providers that use the same namespace and resources for all sessions. When, for example, an application change requires restructuring of the topic namespace, all subscribers must change simultaneously, or two versions of the system must run in parallel, consuming redundant resources. Likewise, if two clients want the same information but with different qualities of service (e.g., one demands very low latency, which is resource-intensive, while the other is happy with higher latency), that must be incorporated into the topic namespace (separate topics must be created for each quality of service for every topic that may be requested). The invention provides an Application Context that provides a "sandbox" of resources that are specific to a given type of application, including plug-in configurations and any dependent configurations, such as content descriptions, etc.

The inventive Application Context makes it easier to extend the functionality of the server while protecting existing applications from change. For example, a new version of an application can maintain backward compatibility with applications associated with the old "sandbox" while supporting the new topic namespace for applications in the new "sandbox."

Furthermore, the relevant Content Adapter can serve both Application Contexts from the same resources (CPU, memory). The Application Context mechanism also provides the means to manage the allocation of key resources such as CPU and bandwidth to different types of applications and deliver the throughput and latency characteristics required for each type of application.

Content-based Permissioning. The invention provides efficient and effective secure authorized-user access to any piece of content by internalizing the ability to check content-based permissions through a Managed Content Plug-in.

Conventional JMS Providers can permission on topic name only, and requires the system administrator to maintain a permissions-lookup database for all topics. When the universe of topics is large and/or dynamic, maintaining an up-to-date database that is readily accessible to every relevant JMS Provider may not be feasible or cost effective.

This is especially true when permission mappings are determined by an external provider (e.g., market data vendor). In such a case, it is better to derive the permission requirements from the content itself. However, only the publishing application has content knowledge in conventional JMS Providers, and implementing Content-based Permissioning in such a case requires the application developer to create (and system administrator to manage) a Rube Goldberg-esque approach, requiring the client and server to exchanges multiple messages regarding each topic request. Ultimately, this does not prevent knowledgeable unauthorized users from accessing the data. Thus, efficient performance of content-based control mechanisms by means of embedding a content provider in the server is another example of the benefits of the invention.

The invention also provides a set of software interfaces and protocols that support authentication and authorization of downstream users with respect to data subscription and publication using modular authorization mechanisms that can vary from one type of data to another.

The invention also provides a computer-implementable means for performing streaming data management as between a data source and a data receiver, comprising: a session oriented client-server architecture and streaming data integration logic providing streaming data subscriptions across multiple servers.

The preferred embodiment of the invention provides a plug-able JMS architecture, including: a modular and extensible mechanism to insert domain-specific implementations of the JMS messaging paradigm into a server-based JMS provider infrastructure (also referred to herein as a JMS server plug-in model). The preferred embodiment further provides a protocol optimized for streaming content management. The preferred embodiment also provides a means for load-balancing of content, supporting scalability of the system.

Co-pending patent applications by the same inventors entitled "System and Method for Integrations of Streaming and Static Data" and "Content Aware Routing of Subscriptions for Streaming and Static Data," elaborate embodiments of the inventive system and method taught herein. Both co-pending applications claim priority from U.S. provisional application 60/783,369, filed Mar. 18, 2006, the entirety of which and the entirety of the two co-pending applications are incorporated by reference as if fully set forth herein. The examples of the invention herein are as the invention applies to the financial services market. However, the invention may be implemented in other markets where high volumes of dynamic data, data integration, messaging and transactions are important.

The invention includes a networked and computer implemented system, and as can be appreciated by those of average skill in the relevant art, the invention includes a memory device capable of storing instructions to direct a computer, as well as apparatus operable to store, receive, and implement instructions from a memory device. The invention is not limited to the code language used, or to any hardware, software or firmware embodiment, but is intended to cover all manners of performing the invention, and configuring the inventive system.

BRIEF DESCRIPTION OF THE DRAWINGS

The present invention will be understood and appreciated more fully from the following detailed description taken in conjunction with the drawings.

FIG. 8 is a depiction of subscription initialization with a Mapping Plug-in.

FIG. 9 is a depiction of subscription initialization with the Managed Content Plug-in.

FIG. 15 illustrates a Mapping Plug-in.

FIG. 16 illustrates a Managed Content Plug-in.

FIG. 17 is a flowchart illustrating transfer protocol.

FIG. 18 illustrates a Re-direct Plug-in.

DETAILED DESCRIPTION OF THE PREFERRED EMBODIMENT

Introductory Remarks

Figure 1:
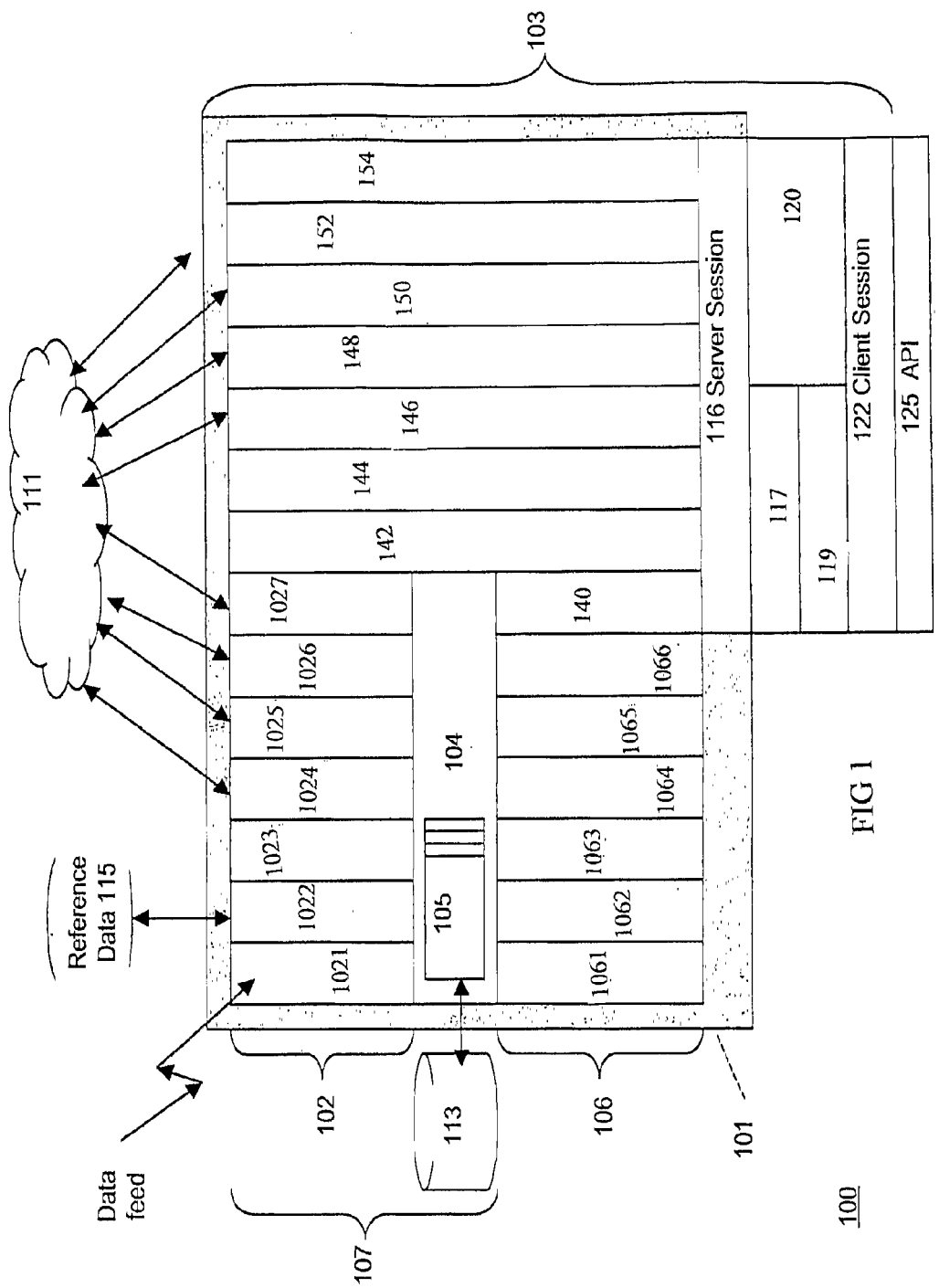
FIG. 1 shows a system architecture including the inventive plug-able JMS.
Figure 2:
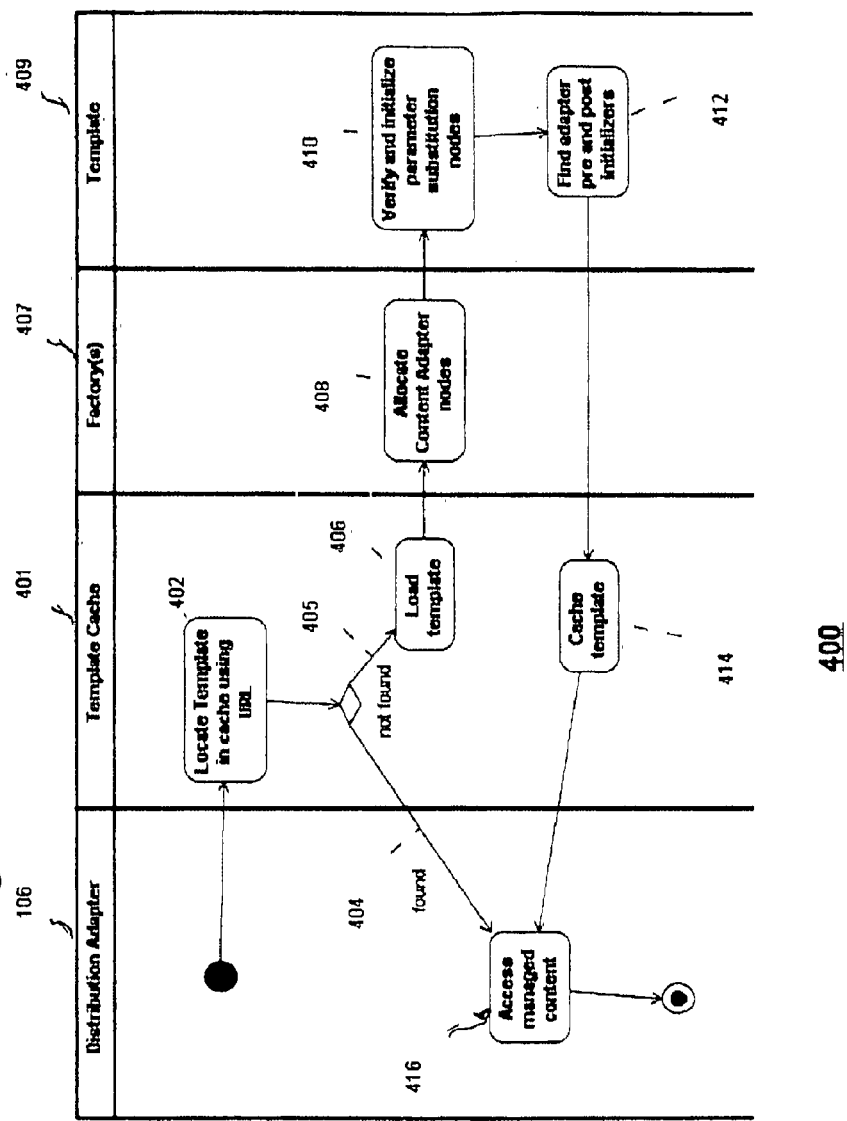
FIG. 2 represents the process of accessing a Template.
Figure 3:
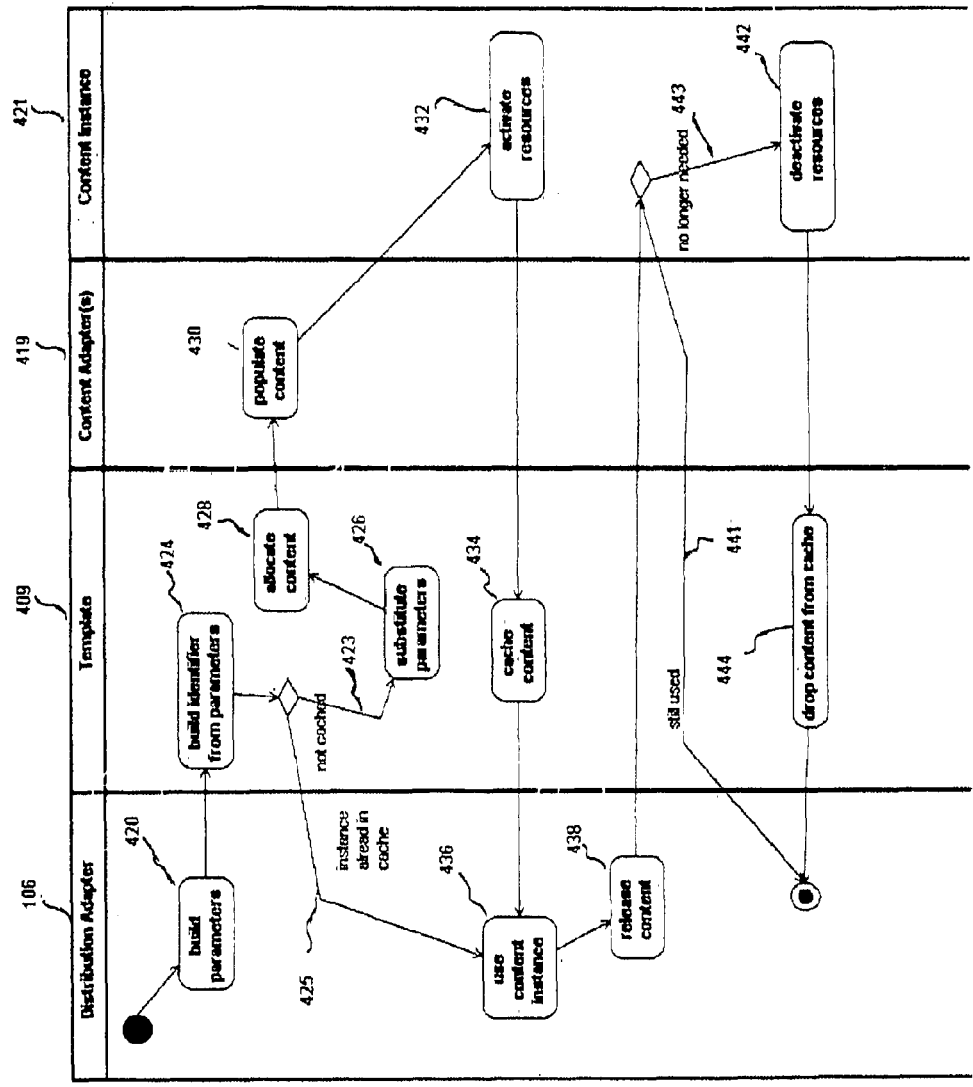
FIG. 3 represents access to a Content Instance.
Figure 4:
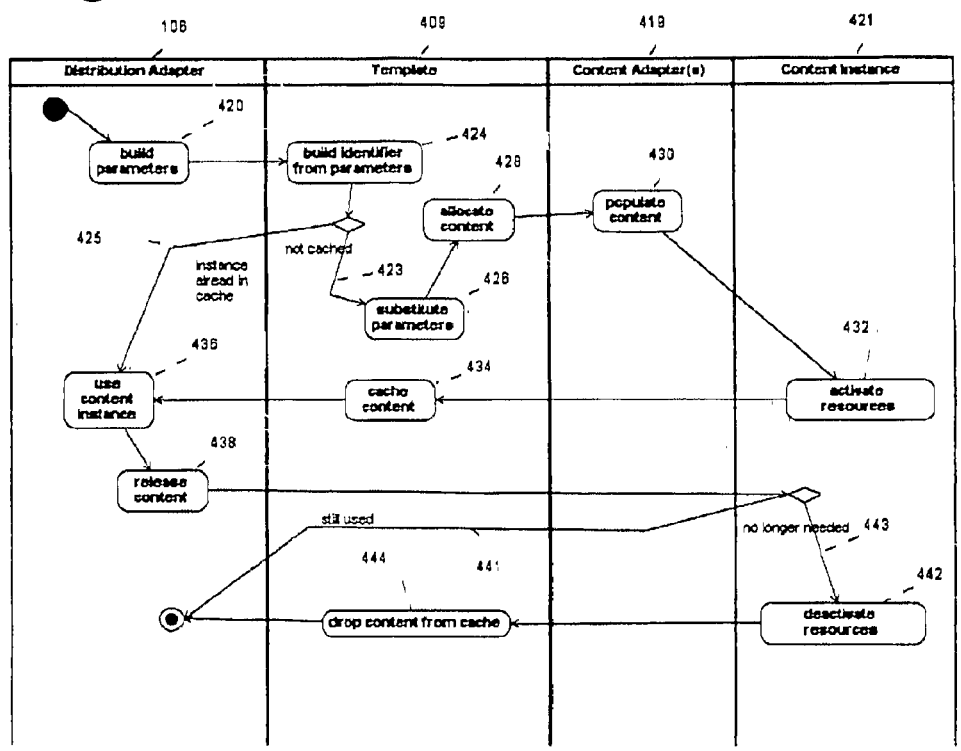
FIG. 4 represents the sequence of event handling.
Figure 5:
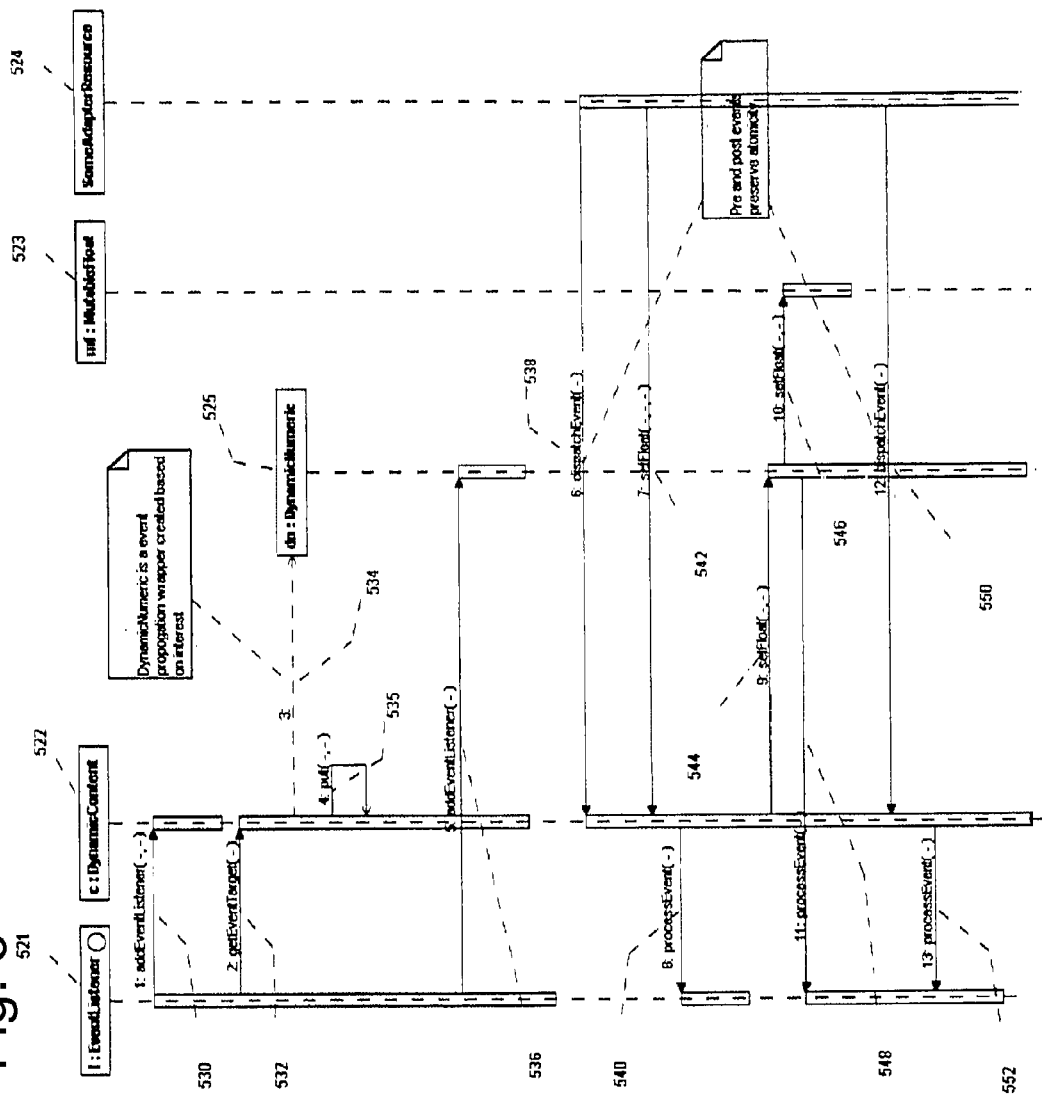
FIG. 5 depicts FIG. 4 in a UML sequence diagram showing setup and adapter event handling.

The inventive architecture of a client server system according to the invention is presented first, followed by an elaboration of a JMS API implementation as a preferred embodiment of the invention. Included in this discussion are inventive aspects (including system and method of integration of streaming data and content aware subscription routing), which are each the subject of companion patent applications in their own right.

For convenience of the reader, an effort has been made to discuss figures in the order presented as well as use of a numbering scheme permitting easy reference to inventive elements depicted in different figures. However, the drawings, figures and depictions are to enhance understanding and not to limit the invention. Defined terms are capitalized. Other terms have their ordinary meaning in the respective art, unless stated otherwise. Moreover, it is understood that the invention is not limited by the specifics of the particular implementation of the invention, including the coding language or configurations peculiar to such elective expressions.

Term usage and definitions. In describing the invention, many terms are used according to common usage and understanding. To aid in the understanding of the invention, we define a selection of terms used in describing the invention.

Application Context: The collection of Context objects used to allocate the Components for a given Client Application.

Atomicity: atomic change. (from database terminology meaning "all or nothing" for transactions). As used herein, atomic change is multiple changes to individual fields grouped as a discrete event associated with a larger unit of content. Example: the coupling of discrete data (e.g. "bid" and "ask" values) such that in the event of a change affecting one of the couple, updates downstream propagate only when both discrete data in the couple have been updated.

Chained Events: Events relating to Managed Content that are induced, within the scope of an atomic update event, by other changes to Managed Content, e.g. a mid-price is the mean of the "bid" and "ask" values and will change when either the "bid" or "ask" change.

Client Application: An application that interacts with the inventive architecture via some type of distribution protocol or programming interface, e.g. a JMS application or an HTTP application (browser).

Client Library: In a client-server JMS Provider architecture, the client-side library that implements the JMS API.

Client Network Connection: In a distributed client-server implementation of the architecture, the client-side manifestation of a network connection between client and server.

Client Session: the manifestation in the architecture of the JMS Session abstraction.

Component: an object; an instance of some class, or an object with references to other, closely related, objects. Simple components provide a specific type of service to other components; complex components combine many other components directly and indirectly to provide many different services and a high level of functionality. Example 1: a component may provide a simple encapsulation of a JDBC connection or even a pool of JDBC connections. Example 2: a JMS server implementation is a component that uses many other components to support remote JMS client applications. Components have a life-cycle, i.e. they need to be initialized when they are created and also need to know when to release any resources they use that are no longer needed. The component lifecycle is managed by the Component Framework.

Component Framework: A collection of software interfaces and associated implementations whose function is to assemble and initialize Components. The Component Framework manages component lifecycle, allocates and stores components for use by other components.

Content Adapter: A Component whose function is populating and maintaining fields/values in one or more Content Instances. A Content Adapter functions to interpret external data events and apply such external data event to such Content controlled by that Content Adapter.

Content-based Permissioning: function of application access control by comparing permission required for a particular Content Instance to permissions associated with the User credential (user identifier) supplied by application; multiple permissioning paradigms are supported as a permission paradigm is assigned to each Content Instance. Content Integration Framework provides the ability to authenticate on the basis of the Content Instance rather than on the basis of topics or names (as in, for example, standard JMS).

Content Cache: A set of Content Templates where each Content Template provides access to one or more Content Instances.

Content Instance: An object comprised of discrete primitive values or fields, which may refer to another Content Instance; a document; a unit of Content. A change in the state or the data associated with a Content Instance is an event.

Content Integration: using a Content Specification that blends data from multiple sources.

Content Integration Framework: In the abstract, the set of Components providing access to Managed Content with a Component Framework.

Content Life-cycle: A process driven by the Content Template comprising the procedure and supporting software interfaces by which a Content Instance is allocated, initialized, maintained or updated, and, finally, released.

Content Link: The run-time object that represents the link between one Content Instance and another.

Content Linking: A mechanism expressed in meta-data and also at run-time by which one Content Specification refers to another and such that Content Instances resulting from a Content Specification with linking meta-data contains a navigable link (Content Link) such that a Distribution Adapter can access data from an arbitrary depth of Content Instances linked in this manner. Content Linking allows the re-use of meta-data and the re-use of run-time resources.

Content Specification: Meta-data; a description used by a Content Template to define the structure of a Content Instance, and to initialize one or more Content Adapters. In the preferred embodiment, a Content Specification is an XML document.

Content Template: An object that uses a Content Specification and Content Adapters to create and maintain a Content Instance. A Content Template is "parametized" such that different parameter values allow for the creation of different Content Instances. A Content Template caches all Content Instances it creates.

Context: An interface; part of the Component Framework providing access to Components; responsible for allocating, initializing and caching Components for use within the application.

Datafeed: A source of streaming data from an external system, e.g. a feed from the New York Stock Exchange (NYSE) or from the Options Price Reporting Authority (OPRA).

Data Model: a collection of Content Specifications as defined by a customer in a particular deployment of the architecture.

Distribution Adapter: A Component whose functions are to encode and distribute Managed Content to downstream applications and also to receive data publishing events from downstream applications and apply such events to Managed Content.

Embedded Connection: In an embedded implementation of the architecture, the connection between client and server sessions.

Event (Content Event): A dynamic change in the state or the data associated with a Content Instance.

FAST: an acronym for FIX Adapted for STreaming; and FIX is itself an acronym for Financial Information eXchange protocol.

JMS: Java Message Service—a standard Java programming interface (see java.sun.com/products/jms/javadoc-102a/index.html).

JMS Provider: an implementation of the JMS standard.

Managed Content: Content accessed by means of the Content Integration Framework as Content Instances.

Mapping Plug-in: A JMS Plug-in whose function is to map publish and subscribe requests to other Plug-ins based on a configured set of expressions against which topic and queue names are matched.

Plug-able: Component-oriented implementations on a server; wherein dynamic configuration of Components permit flexible "plug-ing in" of different implementations of any given application server paradigm.

Plug-able JMS: Component-oriented implementations on a JMS API supporting simultaneous, different implementations of JMS functionality.

Plug-in: JMS Plug-in: A Component whose function is to provide a specific implementation of the JMS messaging paradigm. For example, the Standard JMS Plug-in provides a "typical" JMS messaging implementation, whereas the Managed Content Plug-in supports publish/subscribe access to Managed Content, and a Mapping Plug-in maps messaging Destinations to other Plug-in by partitioning the namespace of Destination names.

Reference Data: Static data relating to market data, e.g. information as might appear in an annual report.

Schema: a rule-set that governs how a type of data/content is specified. The rule set may be an industry standard, or, where no standard exists, defined by the system architecture. The preferred embodiment uses XML (eXtensible Markup Language) for specifications and XML Schema to define the rule set.

Server Application: A collection of one or more Contexts and Components, where a Component is an object (an instance of some class) and a Context provides access to Components.

Server Network Connection: In a distributed client-server implementation of the architecture, the server-side manifestation of a network connection between client and server.

Server Session: A Component whose function is to support a Client Session by means of one.

The invention as generally depicted in FIG. 1, a generalized framework for client/server systems, provides an architecture optimized for real time subscription to static and streaming data, content integration and distribution. The JMS implementation 100 receives input from a variety of streaming and static data sources including middleware 111 (e.g. MDS, TIBCO RV, JMS, MQ Series) as well as reference data 115 and enterprise data (not depicted). As depicted in FIG. 1, a JMS implementation 100 of the invention provides a Component Framework 101. Within the Component Framework 101 a Content Integration Framework 107, including Content Adapters 102, Content Specifications 113, Content Templates 105, and Managed Content 104. The Content Adapters 102 (by way of example) include: Datafeed Adapter 1021; Database Adapter 1022; Analytics Adapter 1023; MDS Adapter 1024; MQ Series Adapter 1025; JMS Adapter 1026; RV Adapter 1027. The Component Framework 101 also includes Distribution Adapters 106. Examples of Distribution Adapters 106 are depicted including JDBC Distribution Adapter 1061; MQ Series Distribution Adapter 1062; MDS Distribution Adapter 1063; SMTP Distribution Adapter 1064; SOAP Distribution Adapter 1065; HTTP Distribution Adapter 1066. The preferred embodiment includes JMS Provider 103, which can be understood to include the Component Framework 101 with the exclusion of the Distribution Adapters 106.

Client Applications may access data from the Content Integration Framework using a variety of different protocols. For each type of distribution protocol, the architecture provides a different type of "Distribution Adapter." The function of a Distribution Adapter is to expose content and content-related events to interested client applications that use a particular distribution protocol. Distribution Adapters provide a mechanism by which data and/or events can be exchanged between the Content Integration Framework and downstream applications. The capabilities of different Distribution Adapters are largely a function of the underlying protocol and not all protocols have the same level of utility. Distribution Adapters can integrate with mechanisms including, but not limited to: a JMS server plug-in as in the current invention; standard JMS providers; proprietary messaging middleware, such as IBM WebSphere MQ and TIBCO Rendezvous; SOAP; Web Services Notification; http get/post; JDBC and ODBC interfaces; flat files; SMTP; SMS; SIP; JSP and ASP interfaces; relational databases; specialty databases, such as KX Systems KDB, VhaYu Velocity; Financial Information eXchange (FIX)/FIX Adapted for Streaming (FAST); proprietary market data systems such as the Reuters Market Data System, IBM WebSphere Front Office, and the Wombat Distributed Ticker Plant.

The JMS Provider 103 is characterized by a modular architecture, comprised of a variety of plug-ins or modules which serve as extensible mechanisms to insert domain-specific implementations of the JMS messaging paradigm into a server-based JMS Provider infrastructure (also referred to herein as a JMS server plug-in model). Such plug-ins depicted include, by way of illustration, JMS Distribution/Content plug-in 140; Std JMS plug-in 142, Redirect plug-in 144; RV plug-in 146; JMS Plug-in 148; MDS Plug-in 150; MQ series plug-in 152; and Mapping Plug-in 154.

The JMS Provider 103 also includes a Server Session 116, a Server Network Connection 117, and a Client Network Connection 119. Further depicted in FIG. 1 are the embedded connection 120, the Client Session 122, and the JMS API 125.

Java Message Service (JMS) is an industry-standard programming interface for a message-based communication between client applications. A Client Application written to this standard should be compatible with any implementation of the JMS API, or, in JMS terminology, any JMS Provider 103. Briefly, JMS Client Applications exchange messages using either "topics" or "queues," each being a type of "destination." Topics provide the means for one or more message publishers to reach one or more subscribers in what is known as the "publish/subscribe" paradigm, where a message from a publisher goes to many subscribers. Queues provide a request/response paradigm as is typically used in a client/server relationship. Conceptually, a message sent via a queue goes to a single receiver, which may or may not respond to the sender, depending on the application-level protocol.

Plug-able JMS. The inventive architecture, system and method provide a JMS architecture that uses a component-oriented, or "plug-able," implementation of its server. The plug-able implementation supports simultaneous different implementations of the JMS functionality. For example, the inventive JMS implementation provides a plug-in that offers typical JMS functionality, as defined by the standard, in which applications send messages to one another using either the topic or queue messaging pattern. It also provides plug-ins whose function is to route JMS messages to and from other middleware infrastructures. This plug-in architecture also allows a JMS provider according to the invention to deliver certain application-level services and integration capabilities that would otherwise be impractical with typical JMS architectures, such as, in particular, providing a specialized plug-in that operates as a Distribution Adapter for real-time content.

The plug-in mechanism is also configurable, and extensible—meaning that the specific set of plug-ins deployed is determined at run-time and can be extended over time. Because the mapping of topic and queue names to plug-in implementation is configurable, developers or system administrators can manage the destination namespace and assign specific names or name hierarchies to a particular type of plug-in.

Another inventive aspect is an ability to provide Application Contexts that are specific to a given type of JMS client application. A typical Client Application has at least an implicit dependency on a set of topics or queues (destinations) that it uses. It is also dependent on message protocols and message semantics associated with those destinations. A destination map and its plug-in configurations (adapter specifications, content definitions, etc.) therefore constitute a set of resources upon which a client application depends. All resources associated with client connections and sessions are allocated via a particular Context associated with the client session. The Application Context approach makes it easier to extend the functionality of the server while protecting existing client applications from change. The Application Context mechanism also provides the means to manage the allocation of key resources such as CPU and bandwidth to different types of client applications and deliver the throughput and latency characteristics required for each type of client application.

Several representative configurations of the inventive architecture are discussed hereinbelow. The preferred embodiment uses a JMS API and the term JMS Provider (also referred to as "Provider") means a representative implementation of the invention.

The JMS Provider 103 targets Client Applications that engage in publish-subscribe activities using real-time market data. Using standard JMS functionality and paradigms, Client Applications based on the inventive JMS Provider can access streaming market data via standard JMS topic subscriptions. Through a single topic, Client Applications can access content that may originate from one or more sources of both static and dynamic content, and may include inline analytics. Client Applications can also subscribe to complex collections (ordered or not) by various criteria. Using topics from the Provider, Client Applications can also publish content to other applications using the Provider and also to applications using other types of enterprise middleware or a dedicated market data system (MDS).

In the example provided herein, the Provider supports market data semantics such as image/update data streams and data condition advisories. In the preferred embodiment, market data semantics are conveyed using JMS Message properties; including a Message Type property, a Status property, a Data Condition property, a Text property, a Data Stream Identifier property and also Next and Previous Stream Identifier properties.

Possible values for the Message Type property include:
Image—these messages provide a complete set of values for a given data stream Update—these messages provide a set of changed values for a given data stream (additional properties may be used to indicate specialized update types such as corrections or end-of-day values)

Status—these messages indicate a change in status or in data condition

Stream Update—these messages are used to change the ordering of streams when multiple data streams are present on a single destination representing an ordered collection (such as an order book sorted by best bid)

The Data Condition property indicates that data is either Stale (meaning the current data values are suspect) or OK. The Status property can have values of OK, Access Denied (supporting Content-based Permissioning), Closed (supporting dynamic collections of multiple data streams whose membership may change over time) or Invalid (i.e. cannot be serviced for some reason). The Text property conveys informational text for human consumption. The Data Stream Identifier provides the means to differentiate multiple streams of data delivered on a single destination. The Next and Previous Stream Identifier properties provide the means to convey order on a collection of data streams.

In addition to market data publish-subscribe activities, Client Applications can also use standard JMS messaging functionality to interact with other applications.

From an implementation perspective, the Provider consists of a programming library—used by JMS client applications—and various server configurations. Servers represent a deployment of the Component Framework 101 including the Content Integration Framework 107 and some combination of Components that provide authentication and authorization, content and middleware integration, and distribution (using the inventive protocol depicted in FIG. 17).

A Provider according to the invention can deliver high volumes of updating data using minimal CPU. It is horizontally scalable and supports various types of load balancing (content-aware routing) across servers to provide efficient use of system resources. Data architects and client application developers have full control over the data model and its representation in JMS; and can also manage the quality-of-service provided to a particular type of client application.

Integrating content from new data sources is simple and may require no additional coding in the Client Application. IT managers manage run-time resources including underlying sessions and connections, CPU, memory, etc and make trade-offs between latency and throughput for different classes of Client Applications, as well as managing the underlying resources and data providers. Because Client Applications are insulated from naming and data model dependencies, systems administrators are free to choose between multiple data sources or vendors. The Provider offers both topic and content field-level access control for publish-subscribe activities. Reporting tools provide a full audit trail of publish/subscribe capabilities and activity.

In alternate embodiments (not depicted) the architecture may be embedded, or of a hybrid character. Moreover, the use of the Content Integration Framework 107 is not restricted to JMS distribution.

In the preferred embodiment, a RMDS Value-Added Server (not depicted) comprising the Component Framework 101 and the Content Integration Framework 107 in conjunction with an RMDS Distribution Adapter, delivers advanced content integration capabilities to the installed base of RMDS applications. In its simplest form it serves as a feedhandler, providing symbology mapping and a customizable transformation of feed data to the RMDS data representation. It can also serve as a highly flexible analytics server that consumes data from various sources, including RMDS, and republishes integrated, value-added content to RMDS consumer applications. The Value-Added Server exposes content collections as RMDS marketfeed chains. Data architects and application developers have full control over the data model and its RMDS representation. New content and analytics can be added without programming. The Value-Added server integrates with DACS, the RMDS entitlements mechanism.

Figure 6:
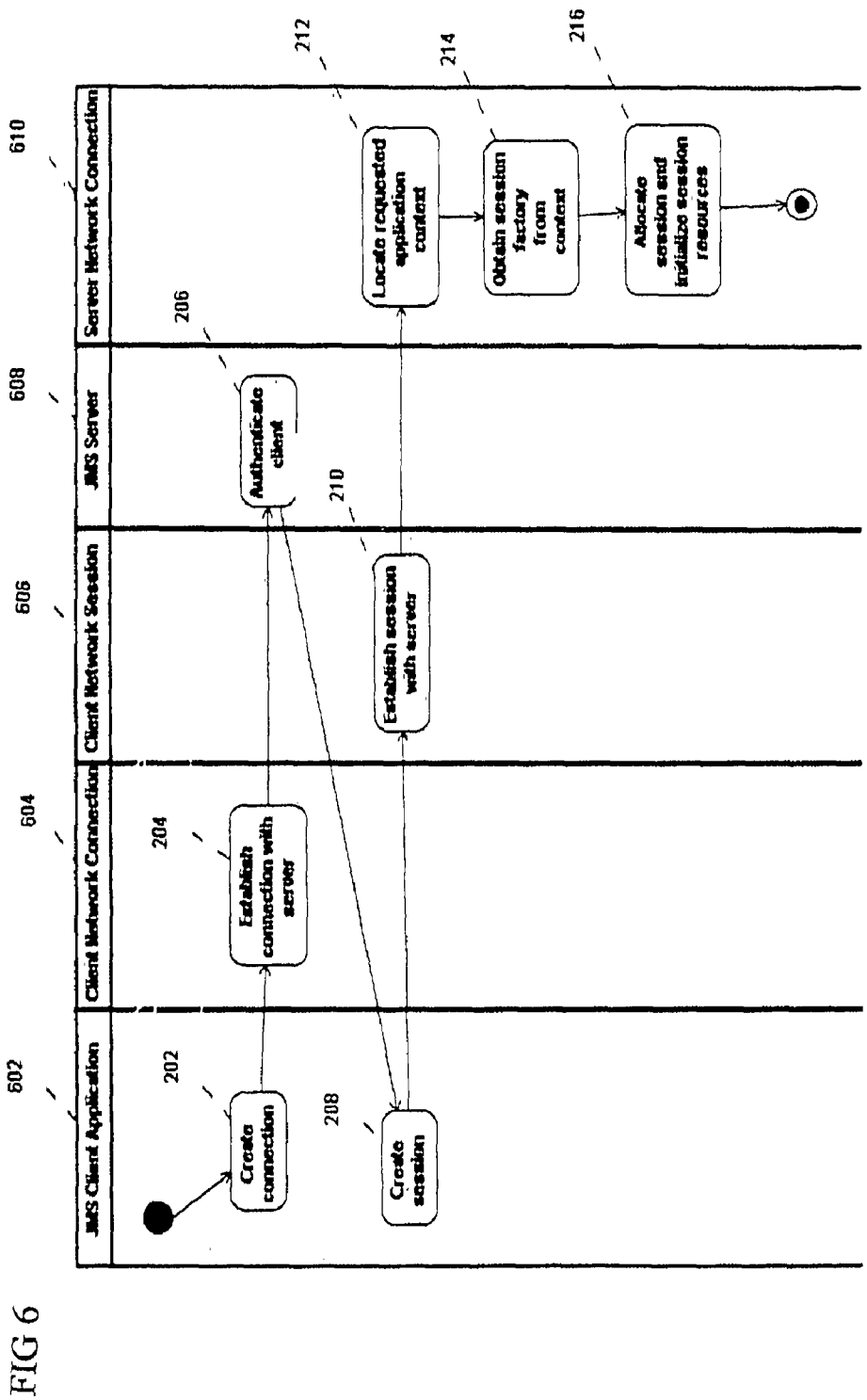
FIG. 6 depicts session initialization.

FIG. 6 depicts session initialization according to the invention, comprising the steps of: creating connection) JMS application 202; establishing connection with server (client network connection) 204; authenticating client (JMS server) 206; creating session (JMS client application) 208; establishing session with server (client network session) 210; locating requested application context (server network connection) 212; obtaining session factory from context (server network connection) 214; allocating session and initializing session resources 216.

Figure 7:
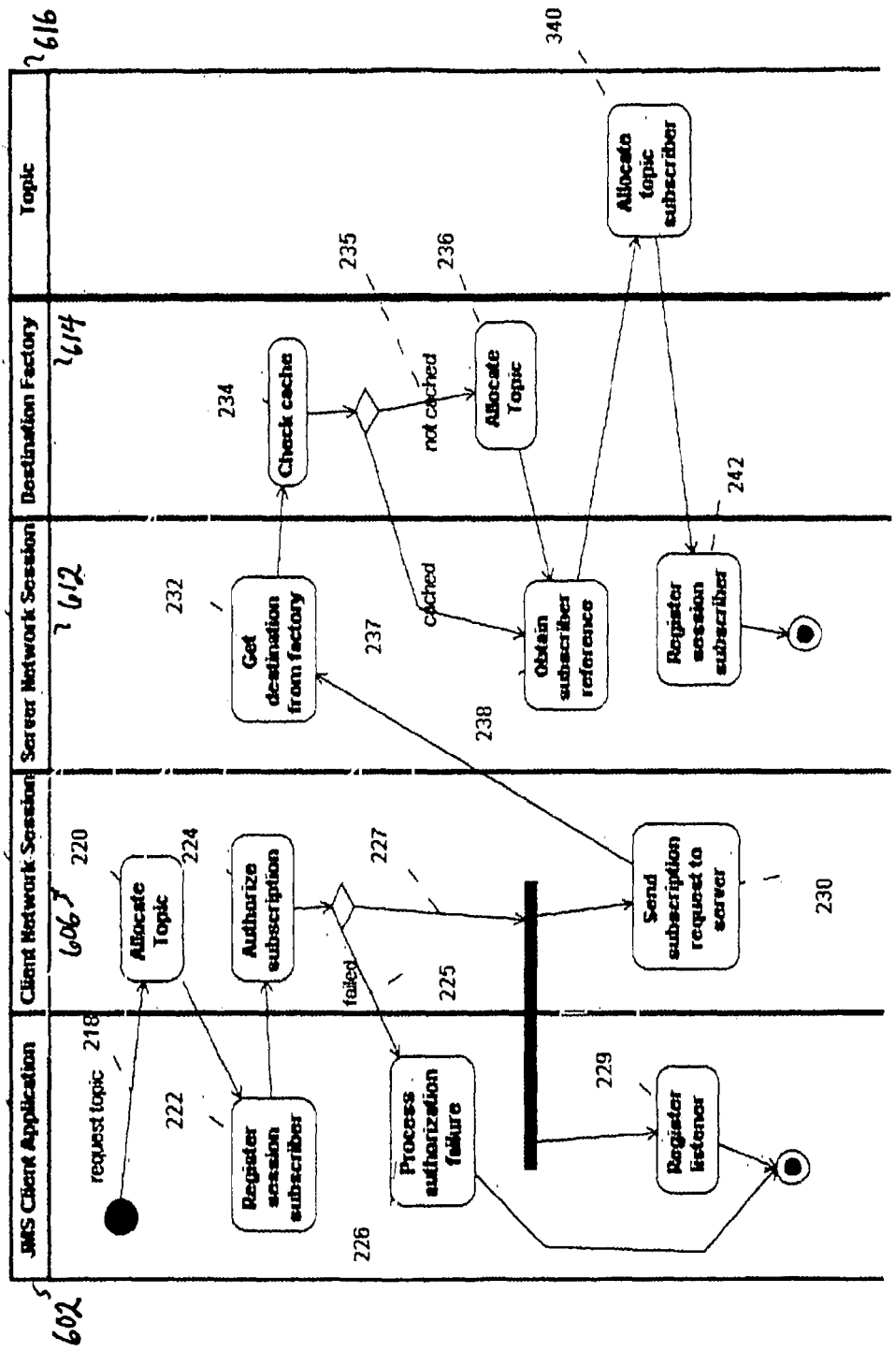
FIG. 7 is a generalized depiction of subscription initialization.

FIG. 7 is a generalized depiction of subscription initialization, comprising the steps of: requesting topic (JMS Client Application) 218; allocating topic (client network session) 220; registering session subscriber (JMS Client Application) 222; authorizing subscription (client network session) 224; determining process authorization failure (JMS Client Application) 226; if failure, then ending 228; if process authorized, then: registering listener (JMS Client Application) 229 and then ending 228; or sending subscription request to server (client network session) 230; getting destination factory (server network session) 232; checking cache (destination factory) 234; if not cached, allocating topic (destination factory) then proceed 236; if cached, obtaining subscriber reference (server network session) 238; allocating topic subscriber (Topic) 240; and registering session subscriber (server network session) 242.

Figure 8:
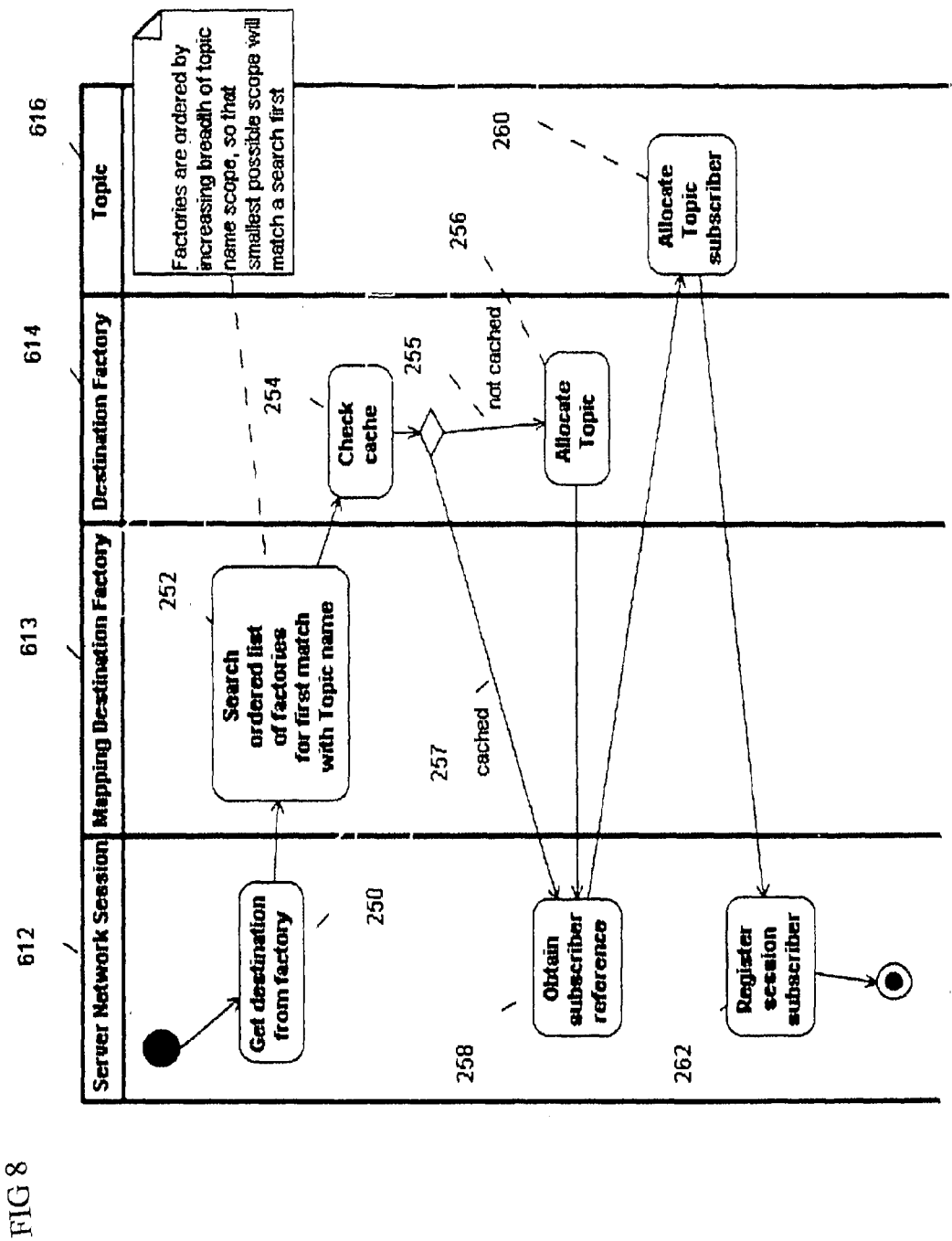

FIG. 8 is a depiction of subscription initialization with a Mapping Plug-in. Subscription initialization with Mapping Plug-in where the method provides for performance of the steps of: Getting destination from factory (server network session) 250; Searching ordered list of factories for first match with topic name (Mapping Destination Factory) 252; Checking cache (destination factory) 254; If not cached, allocating a topic (destination factory) 256; Obtaining subscriber reference (server network session) 258; Allocate topic subscriber (Topic) 260; Register Session Subscriber (Server network session) 262.

Figure 9:
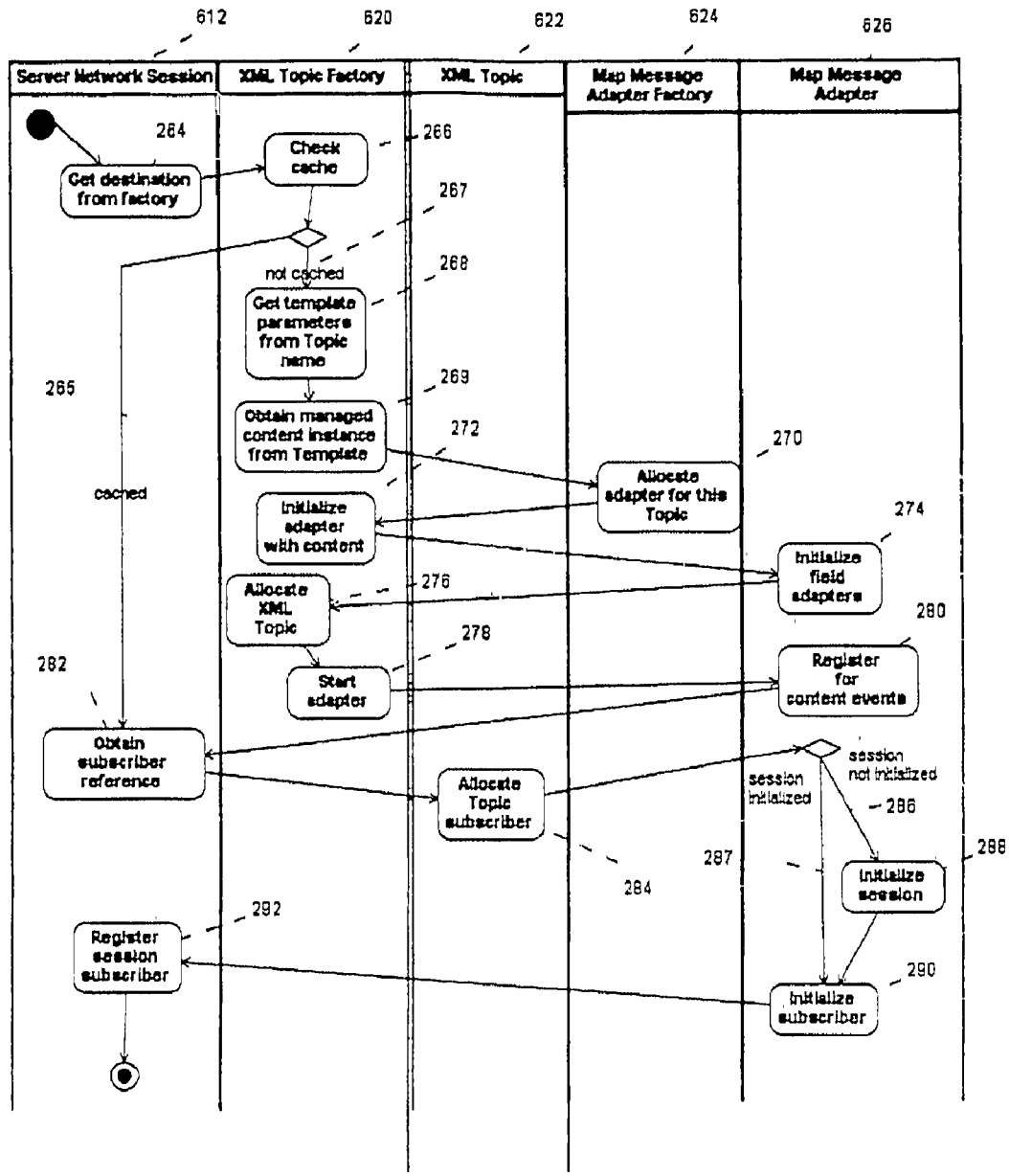
Figure 10:
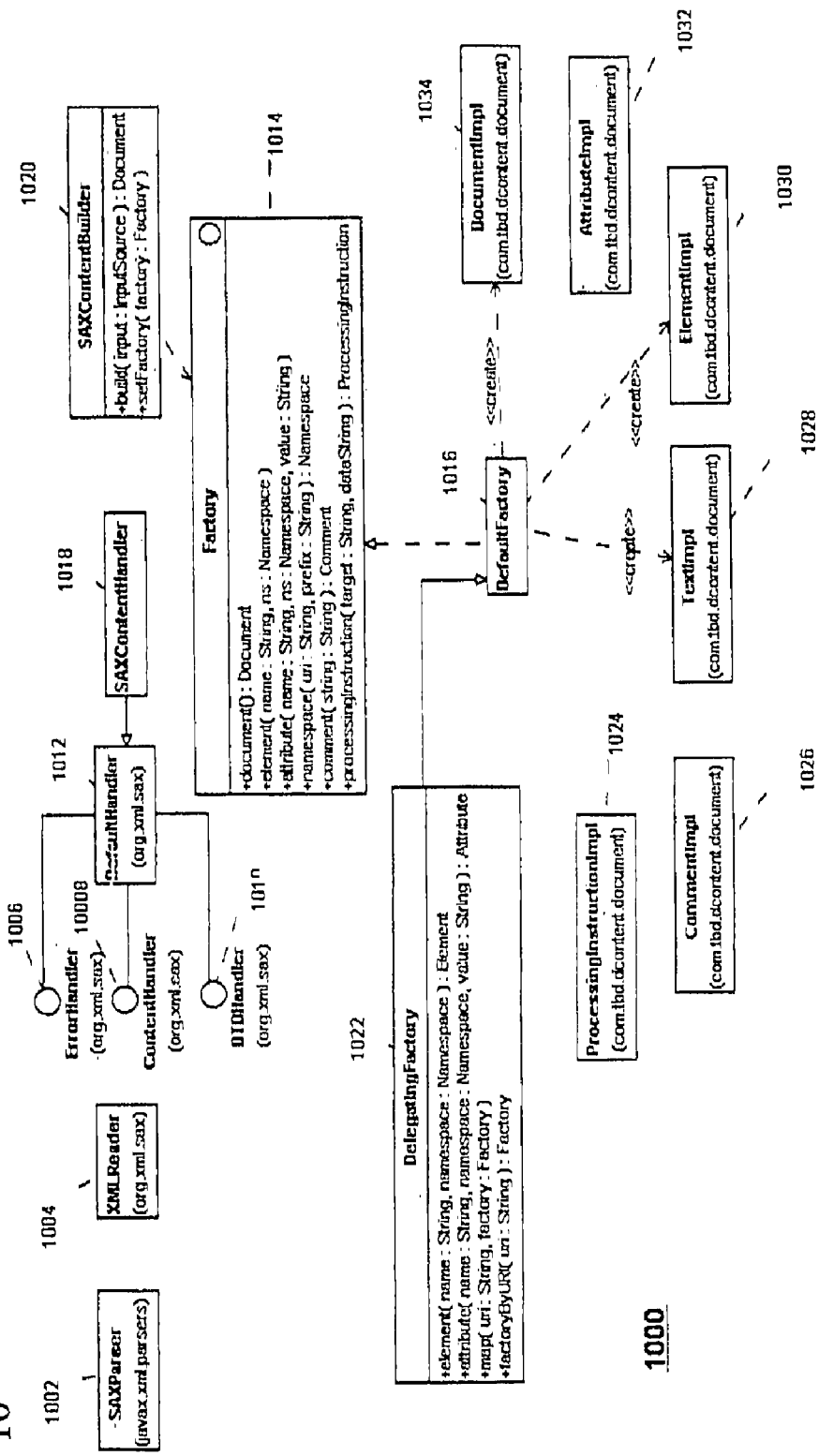
FIG. 10 illustrates the Factory construct.
Figure 11:
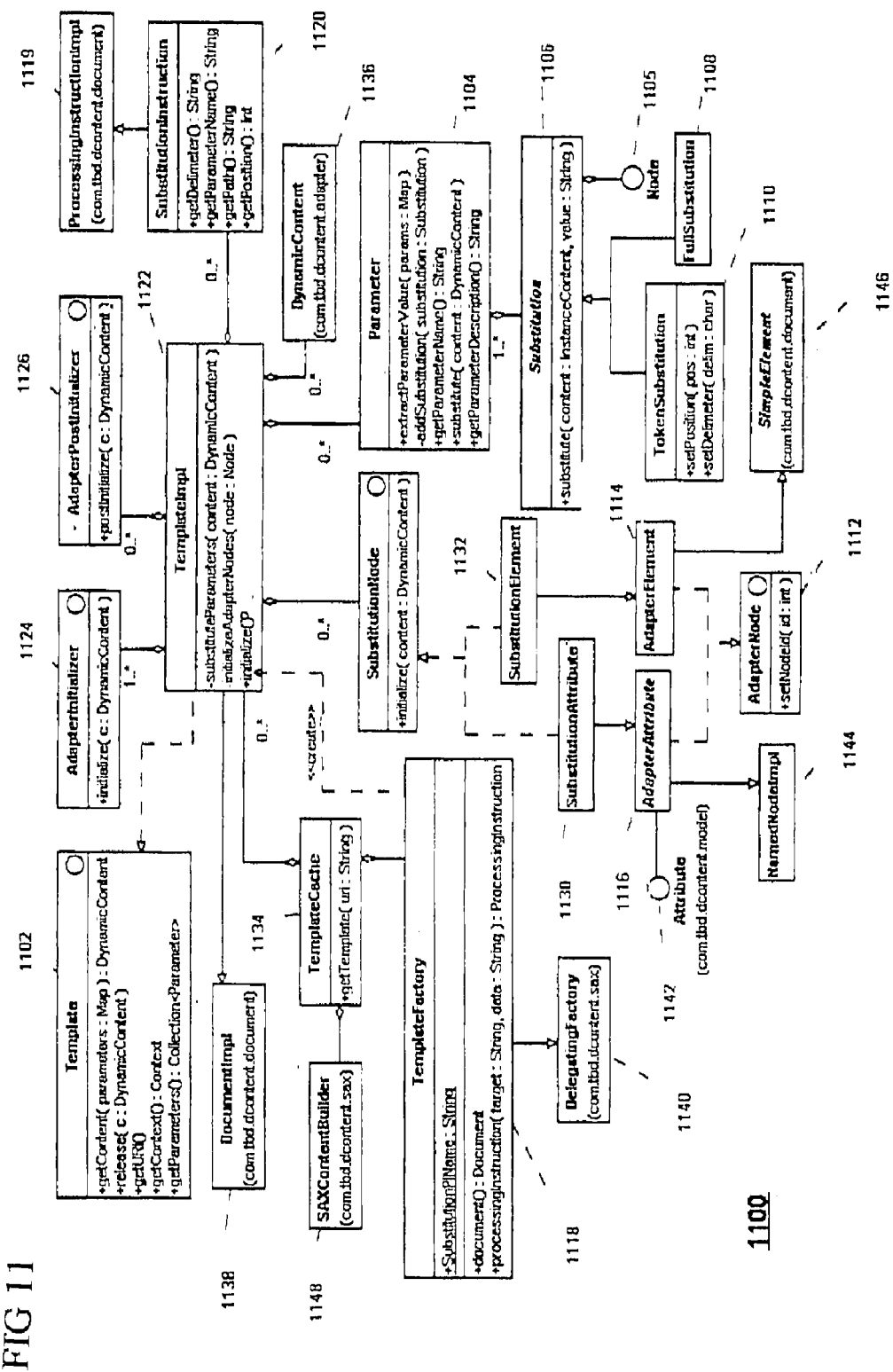
FIG. 11 illustrates Content Templates.

FIG. 9 is a depiction of Subscription Initialization with the Managed Content Plug-in according to the invention; where the steps are as follows: Get destination from factory (server network session) 264; Check cache (XML topic factory) 266; If not cached, Get template parameters from Topic name (XML topic factory) 268; Obtain Content Instance from template (XML topic factory) 269; Allocate Adapter for this Topic (MapMessage Adapter Factory) 270; Initialize Adapter with content (XML topic factory) 272; Initialize field adapters (Map Message adapter) 274; Allocate XML topic (XML topic factory) 276; Start Adapter (XML Topic Factory) 278; Register for Content Events (Map Message Adapter) 280; Obtain subscriber reference (Server Network Session) 282; Allocate Topic subscriber (XML Topic) 284; Determine session initialized (Map Message Adapter) 286; If not initialized, Initialize Session (Map Message adapter) 288; Session Initialized (Map Message Adapter) 290; Register Session Subscriber (Server Network Session) 292.

LOGICAL VIEW OF THE PREFERRED EMBODIMENT

The invention is discussed hereinbelow from a logical view, discussing various design packages according to the preferred embodiment. Select figures are presented for illustration as an aid to understanding. It can be appreciated, however that the text should be sufficient for the practitioner of average skill in the programming art.

Figure 12:
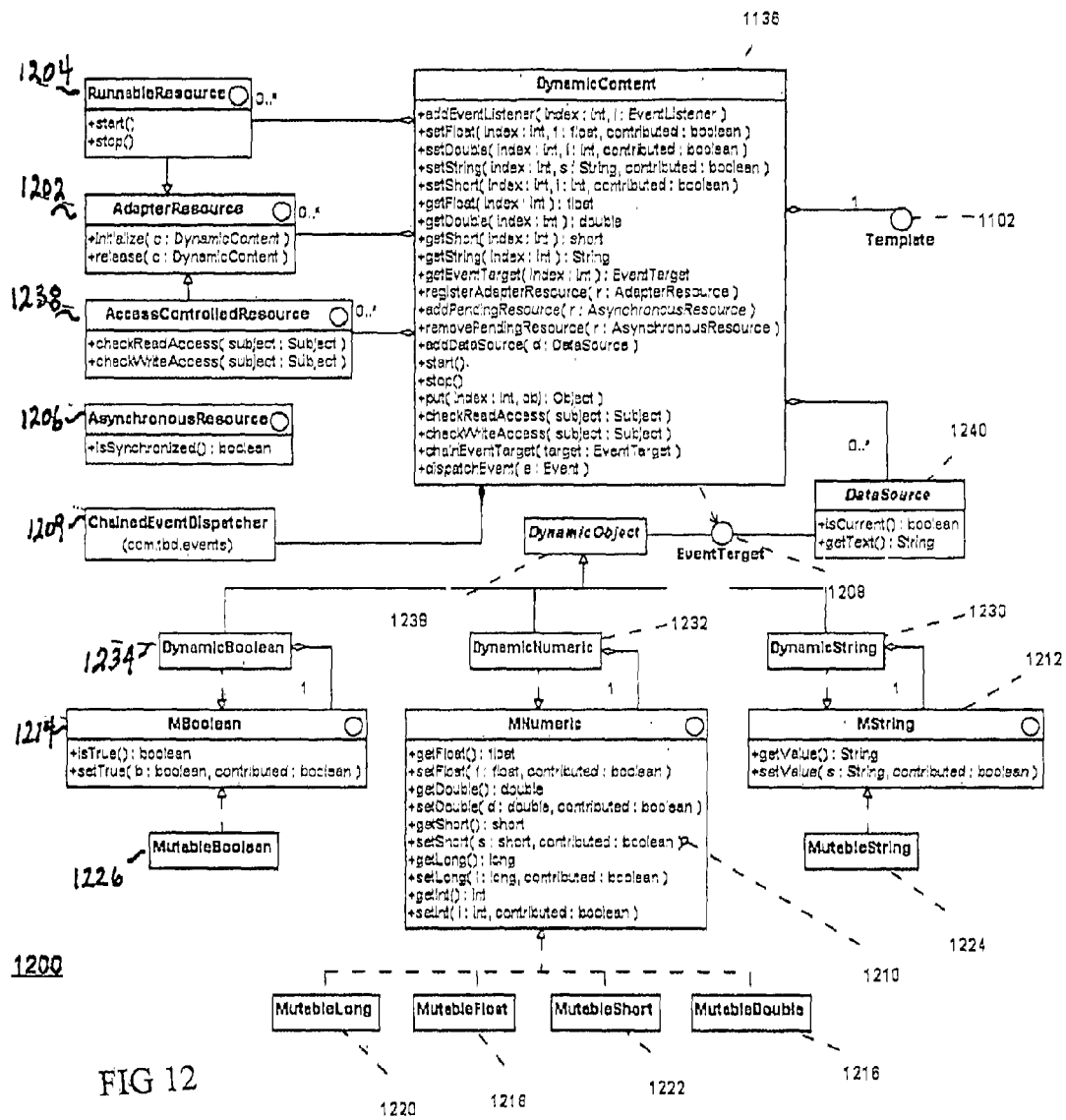
FIG. 12 illustrates Content Instance according to the preferred embodiment.

Referring to FIG. 12, the com.tbd.dcontent.adapter 1200 package extends the basic Data Model with new abstractions and implementations to support different types of Content Adapters. This package provides primitive types for storing and updating dynamic content. It also defines the models (abstractions and conventions) for the Component lifecycle, content state management, and content access control.

The following interfaces support the Content Adapter lifecycle: AdapterResource 1202 abstraction represents a Content Adapter Component that needs to be initialized and released. Instances of AdapterResource are allocated and registered with an instance of DynamicContent during the document initialization phase. RunnableResource 1204 abstraction is an extension of AdapterResource that provides lifecycle support for thread-aware adapter resources, i.e. those that need to be started after initialization is complete and stopped before resources are released. AsynchronousResource 1206 abstraction is an extension of AdapterResource used by adapters that retrieve content asynchronously. Adapters that fit this pattern implement the AsynchronousResource interface and register themselves with their containing DynamicContent instance during initialization. The state of a document is affected by the state of any constituent instances of AsynchronousResource. Once these elements are "synchronized," then the document is also synchronized.

Interfaces and classes in the com.tbd.dcontent.adapter 1200 package provide the primitives for dynamic content, providing storage for primitive values and support for bi-directional content modification are as follows:

MNumeric 1210, MString 1212, and MBoolean 1214 interfaces provide the abstractions for mutable versions of primitive types. The setXXX operations of the above classes have a Boolean argument in addition to the value argument. The Boolean argument indicates whether or not the new value is "contributed," meaning that a downstream client application is setting the value. Content Adapters that accept contributed values create sub-classes of the appropriate MutableXXX class and override the setXXX method to intercept the contributed values. These values can then be passed on to upstream systems.

MutableDouble 1216, MutableFloat 1218, MutableLong 1220, MutableShort 1222 are concrete implementations of the MNumeric abstraction are chosen by Content Adapter designers depending on storage/design requirements. MutableString 1224 class provides a concrete implementation of the MString abstraction. MutableBoolean 1226 class provides a concrete implementation of the MBoolean abstraction. DynamicObject 1228 abstraction provides an implementation of the EventTarget construct.

DynamicString 1230, DynamicNumeric 1232, DynamicBoolean 1234 are concrete implementations of the DynamicObject abstraction implement MString, MNumeric and MBoolean (respectively) and provide event propagation wrappers around primitives of type MString, MNumeric and MBoolean. Content Adapters may install primitives of this type in a DynamicContent instance however, these types use more memory than the equivalent MutableXXX primitives because they allocate storage for the event propagation mechanism. DynamicContent will automatically wrap a MutableXXX field in the appropriate DynamicObject implementation if an event target for that field is requested. For this reason, a Content Adapter should typically install a MutableXXX primitive and always use the index-driven "setter" methods of DynamicObject to update the value of a field, rather than modifying the field itself. DynamicContent can then handle the event propagation calls if necessary.

DynamicContent 1136 implementation of InstanceContent provides the storage and state management for a particular set of dynamic content primitives (fields) associated with a Template 1102. Content Adapter Components associated with a particular instance of DynamicContent use it to: Register adapter resources for lifecycle management and access control; Register adapter resources for data state management; Publish content values and updates; Receive "contributed" values from downstream Client Applications; Preserve atomicity of data change events; Nest content.

Downstream Components, e.g. Distribution Adapter Components, use an instance of DynamicContent to: Perform read and write (contribution) access checks; Access current values for all fields; Receive atomic notifications regarding data updates; Receive notifications regarding data state events; Contribute values; Access nested content. Both Content Adapters and downstream Components such as Distribution Adapters use the Template associated with an instance of DynamicContent for meta-data and navigation. In the case where Content Linking is used, the inventive architecture adopts a convention within the XPath expression of using '#' character is used to delimit boundaries across linked documents, for example //root-a/link-a#/root-b/link-b#/root-c/value. Note that it is possible to analyze an XPath expression and compute a result expressed as a sequence of indices corresponding to the target nodes for each component of the XPath. This means that, having computed the "index path," values can be quickly access by index rather than repeating a potentially expense XPath analysis.

AccessControlledResource 1238 is an abstraction that represents resources within a document (Content Instance) that require authorizations for read or write access by a Subject. Content Adapters that provided access controlled resources should provide an implementation of this interface, in particular those whose function relates to Content-based Permissioning.

DataSource 1240 is an abstraction representing a remote data source. Its function is to expose the state of the remote data source to Distribution Adapters. As an implementation of EventTarget it generates events corresponding to state changes in the data source. Distribution Adapters can then efficiently convey state changes for all content derived from that source.

DataSourcePool (FIG. 14, 1446) is a simple repository of DataSource implementations. The package com.tbd.dcontent.auth provides the interfaces and class for content access authorization based on numeric codes. Using this paradigm, an administrator assigns numeric codes to content and assigns access rights to users based on those codes. The abstraction for code-based authorization mechanisms, CodeBasedAccessController, extends com.tbd.security.auth.SubjectAccessController interface. CodePermission is an implementation of java.security.Permission, granting or denying access based on numeric values.

The com.tbd.dcontent.list package has a single interface and provides an abstraction for sources of content collections (lists). The DocumentListSource abstraction represents a source of document lists, presented as a java.util.Iterator. A request for a list is qualified with a set of parameters, passed as a java.util.Map. The com.tbd.dcontent.list.db package provides a database implementation of the list source abstraction. DBDocumentListSource is a database implementation of the DocumentListSource abstraction. DBDocumentListIterator is an iterator implementation; it traverses a result set from a database query.

DBDocumentListSourceXMLPrototype is specialization of XMLPrototype that configures an instance of DBDocumentListSource.

Figure 13:
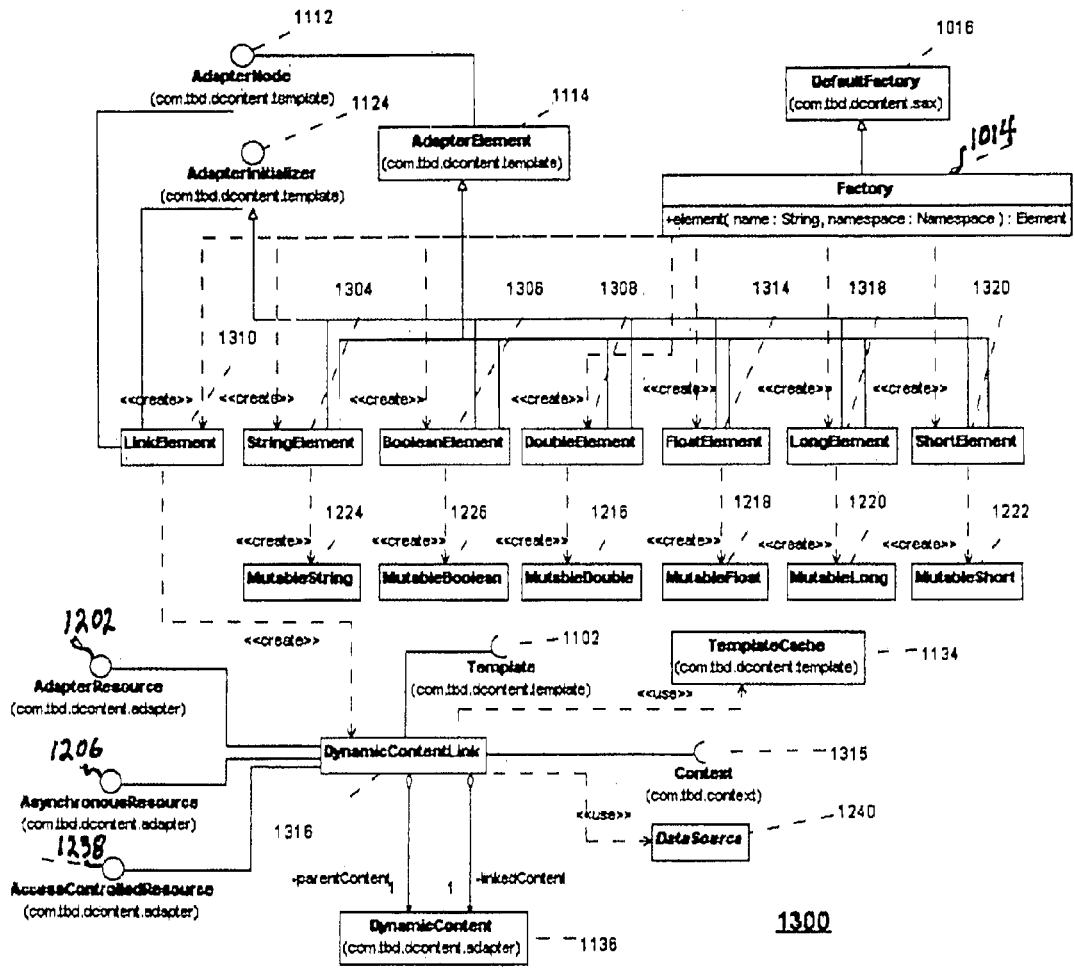
FIG. 13 illustrates primitives datatypes, including linking mechanism for linking one unit of content with another.

The package com.tbd.dcontent.util provides the following: TokenBasedParameterGenerator (see FIG. 16, 1616): extracts the values for a collection of name-value pairs (parameters) from a tokenized string; Parameter: a named entity that extracts as its value one or more tokens from a specific position in a sequence of tokens; MappedParameter: a specialized implementation of Parameter that maps the value extracted from a tokenized string to a value from a different namespace of values with the help of a NameMapper; NameMapper: an abstraction providing the means to map a value from one namespace of values into a value from a different namespace. The following discussion, in conjunction with FIG. 13, describes some exemplary Content Adapters in more detail. The package com.tbd.nca.basic 1300 contains a Content Adapter that provides some primitive dynamic content fields as well as a mechanism for linking one Content Instance with another (Content Linking).

The JMS Server according to the preferred embodiment. In the current embodiment, the package javax.jms contains the standard JMS interface. As the standard JMS interface is well known, it is not set forth here. Inventive aspects of the preferred embodiment are set forth below.

The package com.tbd.jms.client provides the preferred implementation of the standard JMS programming interface supporting both Topic and Queue destination types. The discussion below focuses on the inventive features of the preferred embodiment, and relies for background on the commonly understood properties of JMS. The invention is further discussed in patent applications by the same inventors cited in the introduction.

In the preferred embodiment, ConnectionImpl, an abstract class, is the base implementation for the JMS Connection abstraction. A Connection is a logical connection concept defined by the JMS model. The preferred embodiment of the invention extends implementation of this concept: first, to separate the logical connection from the physical implementation and second, to allow a single logical connection to comprise multiple physical connections to one or more remote servers.

Figure 18:
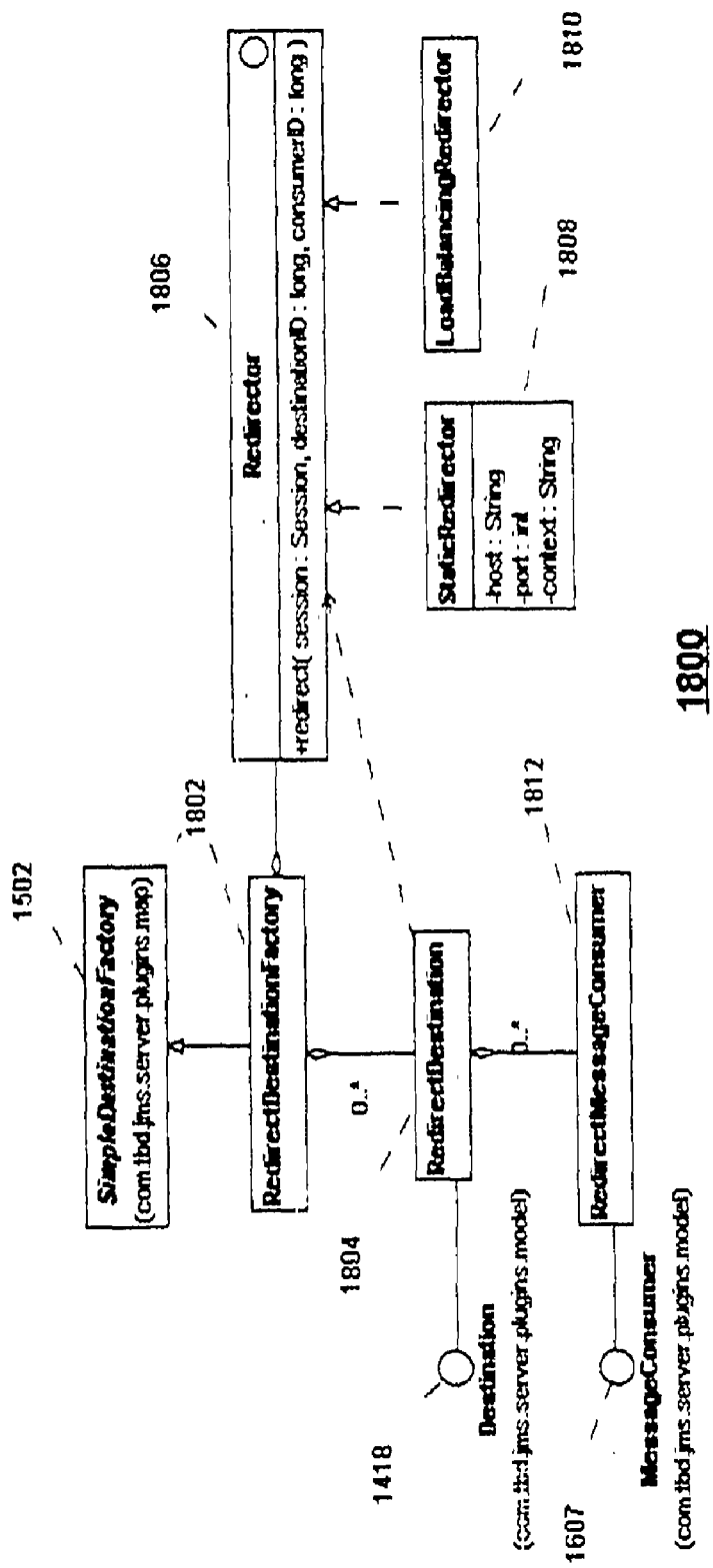
Figure 19:
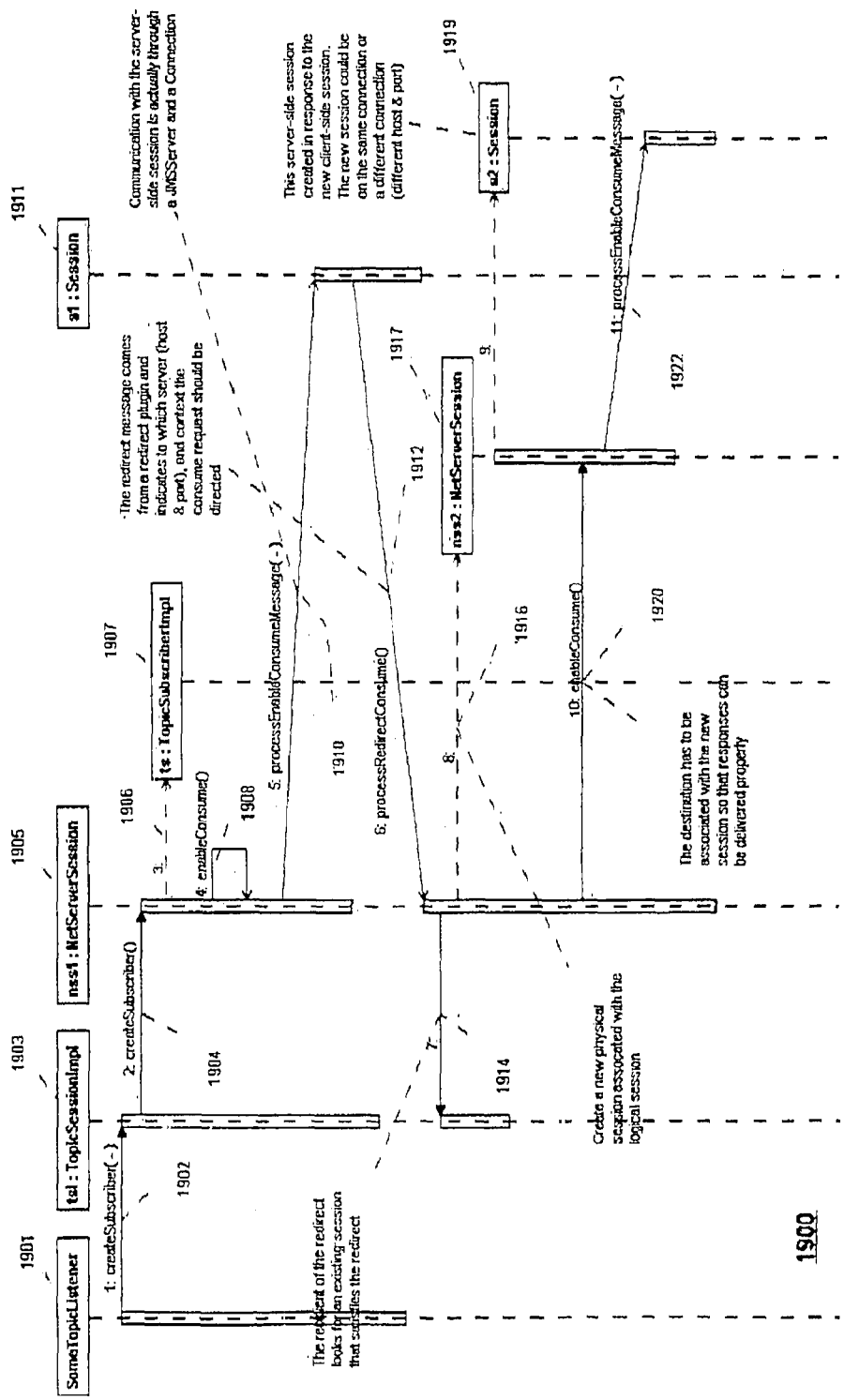
FIG. 19 illustrates subscription load balancing client-side architecture.
Figure 20:
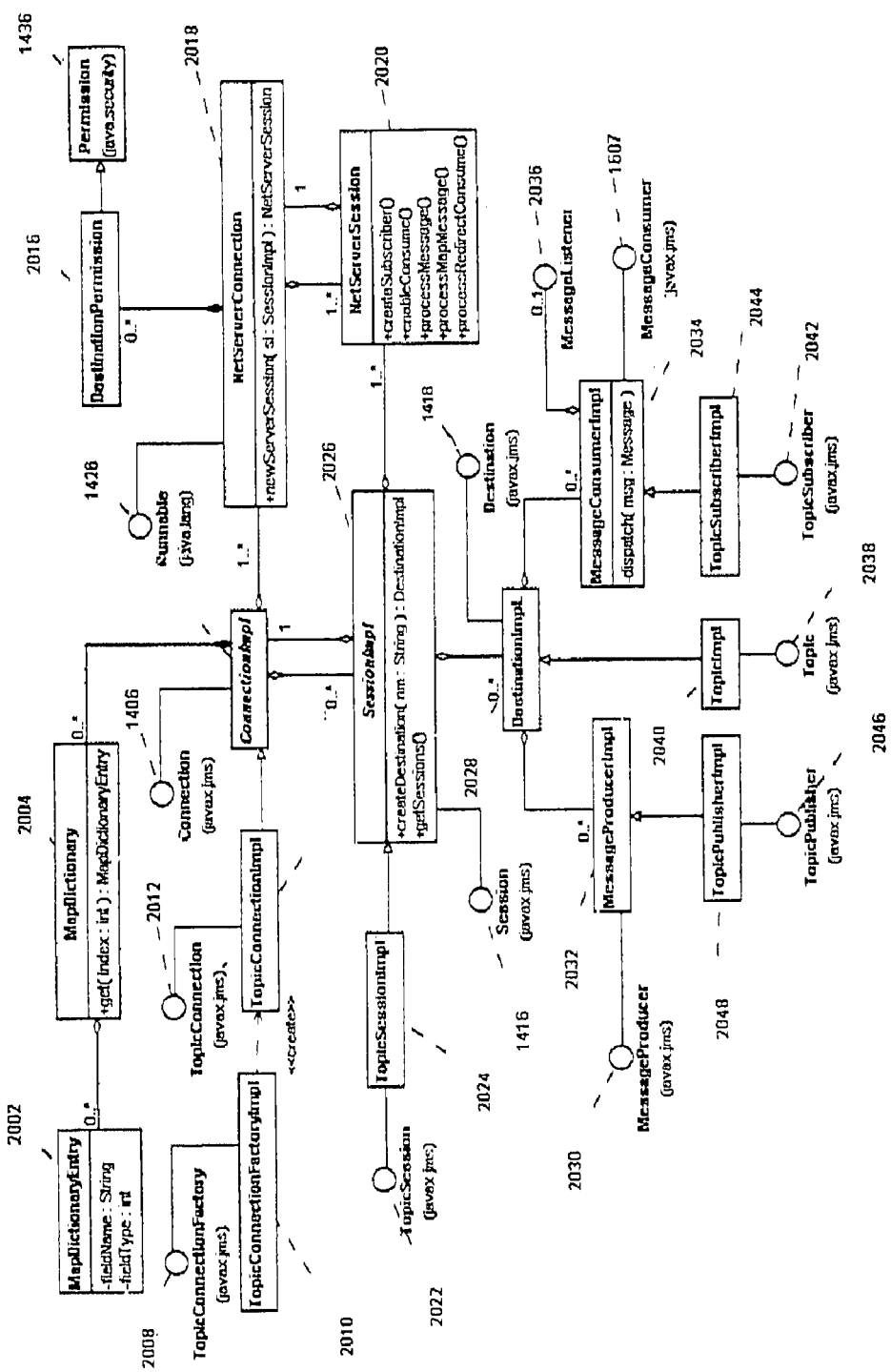
FIG. 20 depicts client-side architecture abstractions that support routing and load balancing according to the invention.

The separation of physical connections (and sessions) from the logical representation supports various types of load balancing in which different destinations are assigned to different servers (see FIG. 18).

When creating a Connection, a client application may specify the host and port specifically or may rely on the connection factory in deciding where to connect. The implementation according to the preferred embodiment provides an extension that allows the client application (or factory) to provide a list of possible host/port server end-points (InetSocketAddress). ConnectionImpl will try each of these in turn, and attempt to establish an initial physical connection (an instance of NetServerConnection). A ConnectionImpl also caches dictionaries used for optimized MapMessage encoding and decoding. This optimization is support by some server-side plug-in implementations. The cache dictionaries is built dynamically as entries are sent by the server on an as-needed basis.

The SessionImpl abstract class is the base implementation for the JMS Session abstraction. A SessionImpl corresponds to the logical session defined by the JMS model. The TBD implementation extends this concept to separate the logical session from the physical implementation and allows a single logical session to comprise multiple physical sessions attached to one or more remote servers. The physical sessions are each represented by an instance of NetServerSession. An instance of SessionImpl creates and caches Destination instances.

NetServerConnection: this class represents a physical connection to a remote server. It implements the standard Java Runnable interface and provides the execution loop that processes inbound and outbound messages for that particular physical connection. A NetServerConnection establishes the physical socket connection and authentication with a server synchronously, i.e. during initialization it performs blocking I/O and waits for a response from the server. The positive acknowledgement from the server will include a list of destination-level permissions for the authenticated user.

A NetServerConnection supports one or more sessions with the server, each of which is represented by an instance of NetServerSession. Connection initialization is synchronous—the connection passes credentials to the server and waits for a response. The connection also caches the instances of destination read/write permissions for the authenticated subject by creating a list of instances DestinationPermission. The permission data is sent by the server as part of a successful initialization sequence. A ConnectionImpl also caches the meta-data for destinations that use a compressed MapMessage protocol.

NetServerSession: A NetServerSession represents a physical session established with a remote server and is the main focal point of all session-level messaging. As a client application creates consumers and publishers, NetServerSession enables the flow of messages between client and server and routes messages to and from the server and any consumers and publishers in the client application.

DestinationImpl is an abstract class that is the base implementations of the Destination abstraction. An instance of DestinationImpl caches instances of MessageConsumer and MessageProducer and, for client applications that consume messages by polling, implements a message queue.

MessageProducerImpl class interacts with a SessionImpl on behalf of a client application end-point that produces messages. MessageConsumerImpl class interacts with a SessionImpl on behalf of a client application end-point that consumes messages.

TopicConnectionFactoryImpl, an implementation of TopicConnectionFactory, creates instances of TopicConnectionImpl. TopicConnectionImpl, a specialization of ConnectionImpl provides a connection for topic-based communication. TopicSessionImpl, an implementation of SessionImpl, provides the functionality to create concrete instances of topic-specific abstractions, i.e., Topic, TopicSubscriber, and TopicPublisher. TopicImpl, an extension of DestinationImpl, provides a concrete implementation of the Topic abstraction. TopicSubscriberImpl, an extension of MessageConsumerImpl, provides a concrete implementation of the TopicSubscriber abstraction. TopicPublisherImpl, an extension of MessageProducerImpl, provides a concrete implementation of the TopicPublisher abstraction.

Figure 14:
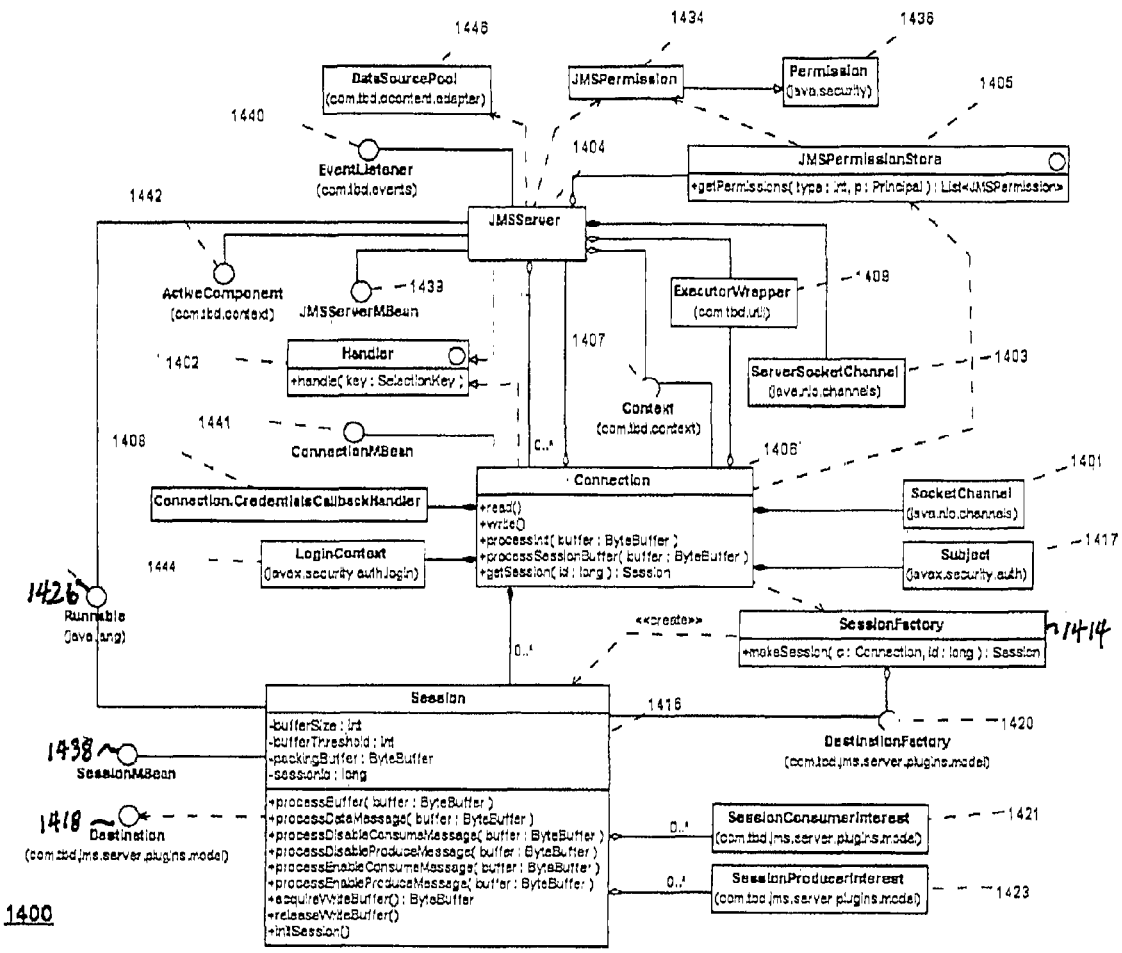
FIG. 14 illustrates the JMS server architecture.

FIG. 14 illustrates a JMS server architecture (com.tbd.jms.server) according to the preferred embodiment. The Handler 1402 interface provides the abstraction for I/O handlers. The JMSServer 1404 class creates the TCP/IP socket [ServerSocketChannel] 1403 that receives inbound connection requests from clients. It also handles the initial notifications for pending I/O operations. In response to connection requests, it allocates instances of Connection 1406 to handle the new channel [SocketChannel 1401]. Read/write indications for the new channel are handed off to the appropriate Connection instance for processing.

The EventListener 1440 interface represents a Component interested in receiving events from some event source. DataSourcePool 1446 is a simple repository of DataSource implementations (an abstraction representing a remote data source whose function is to expose the state of the remote data source to Distribution Adapters) (see 1240, FIG. 12). The ActiveComponent 1442 interface represents Components that require explicit initialization and release via start( ) and stop( ) methods.

The Connection 1406 class represents a remote JMS client API connection. It authenticates client credentials and allocates instances of Session corresponding to session created in the client API. A Connection instance performs the read/write operations for all its Session 1416 instances.

A Connection authenticates a client using a Connection.CredentialsCallbackHandler 1408. Authenticated clients receive a list of destination permissions obtained from a JMSPermissionStore 1405. Clients can then perform destination-level authorization [Permission 1436] without contacting the server.

A Connection uses a SessionFactory 1414 to allocate sessions and retrieves that SessionFactory from a particular Context 1407. If the client application does not specify a Context, a default is applied. A Session 1416 allocates all resources from that Context effectively providing an Application Context that can isolate the resources for one session from other sessions. A Connection 1406 uses the login framework defined by the Java Authentication and Authorization Service (JAAS). When a client connection is created, the server creates a login Context whose implementation is determined by configuration. The JAAS mechanism uses a callback construct Connection.CredentialsCallbackHandler 1408 to obtain the credentials required for a particular login domain. In this case, the server satisfies the call-back requests using initialization data passed by the Client Application. The login Context [LoginContext 1444] will perform validation of credentials. Possible implementations of the login Context include trivial (no credentials required), database-stored name/password, operating system name/password, and distributed mechanisms, such as Kerberos. After successful authentication, the JAAS framework provides an authentication Context, or Subject 1417 that is retained by the Connection.

Connection.ReadWork 1410, Connection.WriteWork 1412 are implementations of Runnable 1426 provide scalability by allowing a Connection to delegate I/O activities to an Executor: (ExecutorWrapper 1409 class is a wrapper around an instance of java.uti.concurrent.ThreadPoolExecutor. The wrapper is a configurable Component exposed for management with JMX. By virtue of being a Component it allows an executor to be shared among multiple Components.)

The SessionFactory 1414 class encapsulates the configuration for a session. All sessions created by a particular SessionFactory have an identical configuration. The Session 1416 class manages requests from the client API for consumption and production of messages. Based on demand from the JMS client application to consumer and/or produce messages it locates instances of Destination 1418 by name using a DestinationFactory 1420, an abstraction. It then obtains instances of MessageConsumer and MessageProducer as appropriate.

A Session uses the JAAS "run-as" construct initiate consumer and producer requests from clients using the Subject associated with the session's Connection. This identity is then available to the plug-in implementations for authorization purposes. The Session provides an audit trail that logs identity, host name, time, and activity type for subscription start/stop and publication start/stop activities.

Session.EnableConsumeWork 1422, and Session.EnableProduceWork 1424, implementations of Runnable, provide scalability by allowing the Session to assign these activities to an Executor. Session.EnableConsumeAction 1428, and Session.EnableProduceAction 1430, implementations of the standard Java PrivilegedAction 1432 interface, encapsulate consumer and produce requests in the identity of the requesting clients and allow a plug-in to perform authorization of client activity. SessionConsumerInterest 1421; SessionProducerInterest 1423 are discussed with FIG. 16.

The JMSPermissionStore 1405 abstraction represents a repository of JMSPermission that provides the list of permissions for a specific identity. JMSPermission 1434 represents consume and produce privileges for a single destination name or a pattern of destination names. The package com.tbd.jms.server.pug-ins.model defines the abstractions and base implementation classes that comprise the modular implementation of the JMS server. Depictions can be seen by reference to FIG. 14 and FIG. 16 as noted. The Destination 1418 interface represents the abstraction for a JMS messaging destination. Destinations can be either topics or queues. In this architecture there can be many different implementations of the Destination abstraction. Each JMS plug-in provides a different type of implementation. The DestinationFactory 1420 interface represents the abstraction for creating destinations. A Session uses this interface to allocate instances of Destination. The DestinationCache 1601 interface represents a collection of Destination instances. Destinations use this interface to release themselves from cache when there are no longer any producers or consumers for that particular destination. The MessageConsumer 1607 abstraction provides the means to route message from a Destination to a particular remote message consumer (via a Session and Connection).

SessionInterest, an abstraction, represents the interest of a Session in a particular Destination for either consumption or production of messages. A SessionInterest retains the unique identifier associated with a particular Destination on a given client Session.

SessionConsumerInterest 1421 is an implementation of SessionInterest represents the interest of a Session in consuming messages from a particular Destination. For each JMS client API consumer (either a TopicSubscriber or a QueueReceiver) the SessionInterest uses the Destination to allocate a corresponding MessageConsumer instance. SessionProducerInterest 1423 is an implementation of SessionInterest represents the interest of a Session in producing messages for distribution to consumers.

Plug-able Logic Framework. The preferred embodiment provides a plug-able framework. Certain plug-ins of the preferred embodiment are discussed herein by way of example and description of inventive aspects. The server includes a plug-in that provides standard JMS functionality for both Topics and Queues, providing transactional capabilities and supporting persistent messages. The discussion assumes familiarity with commonly understood standard JMS functionality.

Figure 15:
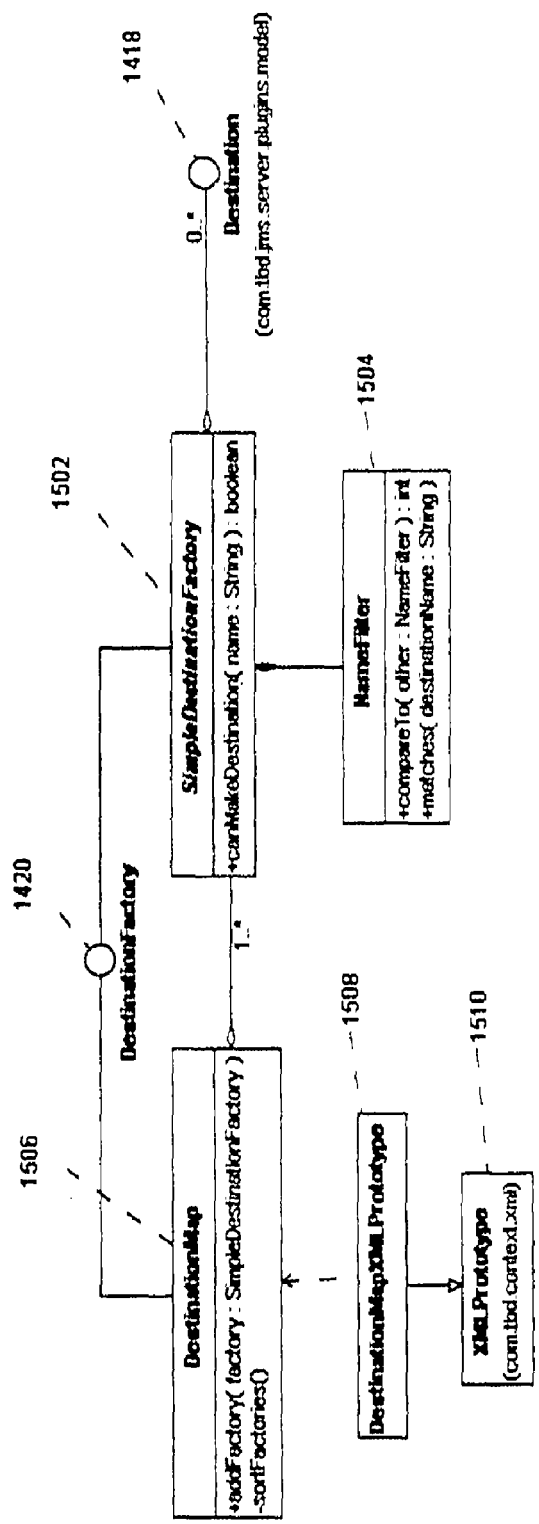

FIG. 15 illustrates a Destination Map or Mapping Plug-in according to the preferred embodiment. The class SimpleDestinationFactory 1502 is a basic caching implementation of the DestinationFactory 1420 abstraction. The different plug-in implementations sub-class this abstract to create the different types of Destination 1418. The NameFilter 1504 utility provides the means to sort a list of SimpleDestination- Factory instances and determine whether or not a particular factory can supply the required destination. NameFilter supports both deep and shallow wildcards. The DestinationMap 1506 implementation delegates the construction of Destination 1418 instances to one of a collection of underlying DestinationFactory 1420 instances. A factory is selected on the basis of the requested Destination name. In effect, the destination namespace is divided up among different factories (plug-ins). A plug-in may support a specific name or, by means of a wildcard expression, a range of names. For example, a plug-in may be assigned to "equity.–," which means all destinations whose names start with "equity." The DestinationMapXMLPrototype 1508 is a custom prototype that configures a DestinationMap with a list of SimpleDestinationFactory instances.

Figure 16:
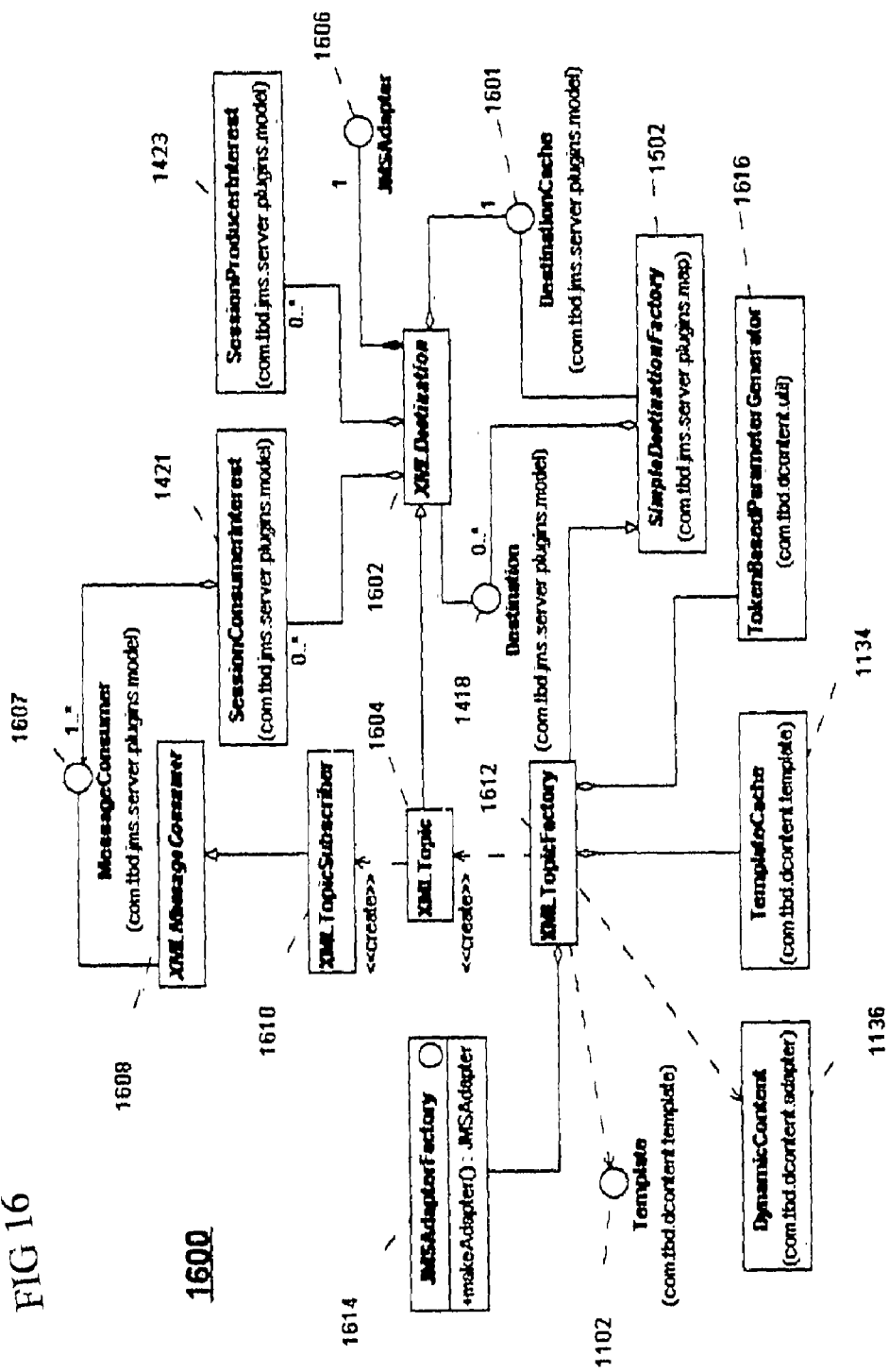

FIG. 16 illustrates an XML Plug-in (com.tbd.jms.server-.plug-ins.xml) according to the preferred embodiment. This XML Plug-in 1600 maps the data and events associated with a content document to a JMS topic, using one of several possible JMS application-level protocols. The mapping of content to a specific protocol is accomplished by means of a JMS adapter. When a client application subscribes to a topic mapped to this type of plug-in, it receives a stream of data messages associated with a single document.

The plug-in configuration handles the mapping of topics to instance documents or to templates. An instance mapping associates a specific named topic with a specific named document. A template mapping uses tokens extracted from the topic name to generate the template parameters.

The preferred embodiment provides a mechanism that maps topic name tokens to alternate values, and provides the means to reference the same stream of market data with multiple symbologies, For example, a client application using a Reuters Instrument Code (RIC) might use the topic "equity.ric.IBM.N" while a client application using the Committee on Uniform Securities Identification Procedures (CUSIP) number might use the topic "equity.cusip.459200-10-1.NYSE".

From the perspective of the Data Model, the XML content plug-in, coupled with an implementation of JMS adapter is a type of Distribution Adapter. Referring to FIG. 16, the XMLDestination 1602 is implementation of Destination 1418 allows a consumer to receive events generated by dynamic content 1136. It also allows producers, SessionProducerInterest, to modify, i.e. contribute to, dynamic content. The XMLTopic 1604 is a topic-centric implementation of XMLDestination. The JMSAdapter 1606 is an abstraction for a Component that maps dynamic content to a JMS protocol. The XMLMessageConsumer 1608 is an implementation of the MessageConsumer 1607 abstraction. The XMLTopicSubscriber 1610 is a topic-centric implementation of XMLMessageConsumer. The XMLTopicFactory 1612 is an implementation of SimpleDestinationFactory 1502 that allocates instances of XMLTopic 1604. It interprets a topic name to generate the parameters [using the TokenBasedParameterGenerator 1616] necessary to instantiate dynamic content 1136 from a particular Template 1102 It associates a JMS-Adapter instance with the content and associates the adapter with the an XMLTopic. The JMSAdapterFactory 1614 is an abstraction for Components that allocate a particular type of JMSAdapter.

Another plug-in, com.tbd.jms.server.plug-ins.list, maps a collection of content to a single JMS topic, relying on JMS Adapter instances to map content to a specific JMS protocol. When a client application subscribes to a topic mapped to this type of plug-in, it receives multiple streams of data messages, each associated with a different document instance. The plug-in accesses the list of documents through list source abstraction, and associates each document provided by the list source with an adapter instance. A number of different implementations of the list factory abstraction are possible, including lists generated by data vendors and lists generated by database queries.

Marketfeed-encoded content is mapped to a JMS map message protocol by a plug-in (com.tbd.jms.server.plug-ins.mf), a useful mechanism to expose RMDS Marketfeed content to JMS client applications. Further included are plug-ins that: a) provide implicit conversion of TIBCO Rendezvous messages to Topics with a MapMessage protocol; b) provide implicit conversion of arbitrary JMS providers to Topics and Queues in the preferred embodiment; c) provides implicit conversion of IBM MQSeries queues to Queues according to the preferred embodiment.

Protocol. As depicted in FIG. 17, the invention provides a method for transmission of data between a client-side of the JMS provider (Client) and a server-side JMS provider (Server), where said data is represented to JMS client applications as JMS MapMessages, and where the protocol comprises the steps of:

Step 1 Client requests [Server] permission to publish/subscribe to Destination

Step 2 Server determines a) permission and
b) eligibility of Destination for Optimization Step 3 If not eligible: Client transmits message to Server w/o optimization; If eligible, go to step 4.

Step 4 Message is optimized by the sub steps of:
a) Server determines that Client should use a particular destination-specific dictionary [DSD];
b) Server sends DSD to client session;
c) Client session saves Destination specific dictionary for session-life;
d) Server sends client a reference to DSD for Destination;
e) Client uses reference to associate DSD with Destination;
f) Server sends message to Client using coding implied by dictionary as appropriate to DSD for the particular Destination;
g) Client interprets Server message using meta-data from DSD;
h) Client represents meta-data message to JMS API as MapMessageObjects;
i) Client transmits optimized message to Server; and
j) Server may send to client a new DSD followed by a reference to that DSD for some Destination.

In the inventive architecture, the use of a Destination-Specific Dictionary enables message optimization as follows:
a) For each field that may be present in a MapMessage, the field is assigned an index starting from zero;
b) The dictionary describes the number of fields and the name and type of each field (e.g. string, floating point, long integer, boolean etc);
c) The data portion of an encoded MapMessage is preceded by a variable-length bit-map (a sequence of binary bits);
d) The first bit in each byte is used as a stop bit wherein the presence of a 1 indicates no further bytes in the bitmap.
e) A value of 1 at a particular point or index in the bitmap indicates the presence of an encoded value for the field having the corresponding index in the dictionary.
f) The specific encoding technique and the number of bytes required to represent a particular value will vary depending on the type of the field. The Dictionary is used to determine the decoding technique that must be applied for each value.

g) When full "image" messages are sent, all bits in the bitmap are fully populated, i.e. all bits (except stop bits) being set to 1;

h) When "update" messages are sent the bitmap is sparsely populated, having bits set to 1 only for those indices corresponding to fields in the message.

i) Further, the number of bytes in the bitmap transferred need only be large enough to accommodate the highest field index in the update, rather than the full number of indices in the image.

When this protocol is applied in the context of the a Distribution Adapter associated with the Content Integration Framework or other Plugins the result is a highly efficient distribution protocol that minimizes packet sizes and the processing required to encode, transfer and decode messages. For example, the meta-data that describes the mapping of Managed Content to the MapMessage protocol can order the fields such that fields that update more frequently are represented early in the bitmap whereas those that update less frequently or not at all are represented later in the bitmap, thereby reducing the size of the bitmap sent with updates.

Consider that without this mechanism of the inventive architecture each MapMessage would have to convey the name, type, and value of each field in each message.

Content Aware Routing. Notable is the subscription load-balancing performance provided by the invention in a preferred embodiment. Various plug-ins supports various types of destination-level redirection or load balancing. [For additional discussion, please refer to the companion patent application cited in the introduction.] As depicted in FIG. 18, RedirectorDestinationFactory 1802, a specialization of SimpleDestinationFactory 1502, creates instances of RedirectDestination 1804 and has a reference to some implementation of the Redirector 1806 abstraction. RedirectDestination 1804, an implementation of Destination 1418, uses the Redirector from the factory to redirect all consumers and subscribers. The Redirector 1806 abstraction encapsulates different types of redirection algorithms. StaticRedirector 1808 is an implementation of Redirector configured to redirect requests to a specific host, port, and Context. When combined with a Mapping Plug-in, this implementation is useful for partitioning servers based on the destination namespace, so, for example, content can be partitioned across multiple servers. Further, the LoadBalancingRedirector 1810 implementation of Redirector monitors a pool of JMS provider implementations that provide equivalent capabilities and redirects requests to different providers based on relative load. The load-balancer and the servers communicate using peer group middleware such as JGroups peer-to-peer communication with a TCP/IP transport [JGRPS]; the servers use JGroups to publish their load-factor.

JMS Server Application Configurations. In the preferred embodiment, Server applications defined by this architecture are collections of Components. Runtime configuration governs the precise makeup of a server application. The only required class is an instance of com.tbd.application.Application which uses command line parameters to create an initial Context with a specified resource search path. From that Context the Application then bootstraps itself to create the top-level Components in the system. The Context initializes these Components which, in turn, need other Components and so on. If the Components created during initialization allocate threads then the application runs until all those threads terminate.

TABLE 1

Descriptions of Application/Process Examples

| Application/Process | Description |
|---|---|
| JMS Server | The JMS Server product in its simplest configuration is a single application comprised of the JMS server Component, one or more JMS plug-ins, Content Adapters, and, as needed, an HTTP Distribution Adapter. In a few cases, Components will require dedicated threads, e.g. the JMS server input thread, but for the most part processing is divided into tasks that can be assigned to one or more thread pools via the executor construct. For example, an administrator could define an executor and an associated pool of threads to handle one or more Content Adapters and separate executors to handle image requests and update distribution. The administrator can control the number and priority of threads for each executor, fine-tuning the balance between responsiveness, throughput and latency. |
| JMS Load Balancer | The JMS Load Balancer is a stand-alone application using two threads of execution: one for responding to JMS connection requests and the other for handling JGroup messages. |
| JMS Router | The JMS Router process routes JMS messages between a peer group of JMS Servers. It is actually a specialized configuration of the JMS Server that comprises either an XML Content Plug-in, a Standard Plug-in, or both. |

Concluding remarks. The examples of the invention herein are as the invention applies to the financial services market. However, the invention may be implemented in other applications where high volumes of dynamic data, data integration, messaging and transactions are important. The scope of the invention is not limited to the examples or the description of the preferred embodiment, as other embodiments within the scope of the invention will be apparent to those of skill in the related art.

The invention claimed is:

1. A Java Message Server (JMS) comprising:
a processor;
a computer readable medium comprising instructions that when executed by the processor comprises:
a plurality of plug-ins, each plug-in corresponding to one of a plurality of JMS session providers;
receiving a first request from a JMS client to establish a JMS session, wherein the first request comprises an application context name; and
in response to the first request, analyzing names of the plurality of JMS session providers to match the application context name and to establish the JMS session;
wherein the established JMS session has a configured JMS destination provider to which it delegates servicing of subsequent destination publish-subscribe requests.

2. The Java Message Server of claim 1, wherein the configured JMS destination provider delegates the servicing of destination publish-subscribe requests to one of a plurality of configured second JMS destination providers sorted according to destination name filters, further comprising:
receiving via the established JMS session, one or more second requests from the JMS client to access one of the second JMS destination providers for the JMS session; and
analyzing the sorted JMS destination providers to find a matched second JMS destination provider that gives the best match for the requested destination name.

3. The Java Message Server of claim 2, wherein the sorted JMS destination providers comprises a sorted sequence with JMS destination providers having a specific filter listed before JMS destination providers having a generalized filter.

4. The Java Message Server of claim 2, wherein the matched JMS destination provider implements an application-level messaging protocol interaction with a JMS client application.

5. The Java Message Server of claim 4, wherein the application-level messaging protocol comprises processing subscription requests, processing publication requests, and generating or routing messages to and from the JMS client application.

6. The Java Message Server of claim 2, wherein the matched second JMS destination provider provides publish-subscribe access to one or more streams of dynamic data, where the access comprises interaction with locally cached data or interaction with external systems in conjunction with message transformations.

7. The Java Message Server of claim 6, wherein the matched second JMS destination provider uses a dictionary to optimize JMS MapMessages relating to one or more streams of dynamic data conveyed over a single destination.

8. The Java Message Server of claim 7, wherein the dictionary provides message optimization comprising:
  for each field that may be present in a JMS MapMessage, the field is assigned an index starting from zero;
  the dictionary describes the number of fields and the name and type of each field;
  when JMS MapMessages are sent, the encoded map message data is preceded by a variable length bitmap indicating which fields are present in the message;
  when the bitmap is encoded it comprises a minimal size to accommodate the largest index for fields actually present in the message;
  when full image messages are sent, all bits in the bitmap are fully populated;
  when update messages are sent, the bitmap is sparsely populated, having bits set to 1 only for those indices corresponding to fields in the message;
  when receiving the sparsely populated bitmap, a receiver can work through the encoded bit map and encoded data in sequence where the presence of a 1-bit in the bit map conveys the index of the dictionary entry and the technique for decoding the subsequent bytes in the data portion of the encoded message.

9. The Java Message Server of claim 7, wherein each destination relays messages relating to one or more dynamic data streams, wherein each dynamic data stream conforms to one of a plurality of possible combinations of fields.

10. The Java Message Server of claim 9, wherein for each unique combination of fields the server generates a dictionary and assigns an id.

11. The Java Message Server of claim 10, wherein the sender sends to the client only those dictionaries that are required on an as-needed basis before sending any encoded message that rely on the dictionary.

12. A computer readable medium having instructions stored thereon that, when executed by a processor, causes the processor to function as a Java Message Server (JMS), the instructions comprising:
  a plurality of plug-ins, each plug-in corresponding to one of a plurality of JMS session providers;
  receiving a first request from a JMS client to establish a JMS session, wherein the first request comprises an application context name; and
  in response to the first request, analyzing names of the plurality of JMS session providers to match the application context name and to establish the JMS session;
  wherein the established JMS session has a configured JMS destination provider to which it delegates servicing of subsequent destination publish-subscribe requests.

13. The computer readable medium of claim 12, wherein the configured JMS destination provider delegates the servicing of destination publish-subscribe requests to one of a plurality of configured second JMS destination providers sorted according to destination name filters, further comprising:
  receiving via the established JMS session, one or more second requests from the JMS client to access one of the second JMS destination providers for the JMS session; and
  analyzing the sorted JMS destination providers to find a matched second JMS destination provider that gives the best match for the requested destination name.

14. The computer readable medium of claim 13, wherein the sorted JMS destination providers comprises a sorted sequence with JMS destination providers having a specific filter listed before JMS destination providers having a generalized filter.

15. The computer readable medium of claim 13, wherein the matched JMS destination provider implements an application-level messaging protocol interaction with a JMS client application.

16. The computer readable medium of claim 15, wherein the application-level messaging protocol comprises processing subscription requests, processing publication requests, and generating or routing messages to and from the JMS client application.

17. The computer readable medium of claim 13, wherein the matched second JMS destination provider provides publish-subscribe access to one or more streams of dynamic data, where the access comprises interaction with locally cached data or interaction with external systems in conjunction with message transformations.

18. The computer readable medium of claim 17, wherein the matched second JMS destination provider uses a dictionary to optimize JMS MapMessages relating to one or more streams of dynamic data conveyed over a single destination.

19. The computer readable medium of claim 18, wherein the dictionary provides message optimization comprising:
  for each field that may be present in a JMS MapMessage, the field is assigned an index starting from zero;
  the dictionary describes the number of fields and the name and type of each field;
  when JMS MapMessages are sent, the encoded map message data is preceded by a variable length bitmap indicating which fields are present in the message;
  when the bitmap is encoded it comprises a minimal size to accommodate the largest index for fields actually present in the message;
  when full image messages are sent, all bits in the bitmap are fully populated;
  when update messages are sent, the bitmap is sparsely populated, having bits set to 1 only for those indices corresponding to fields in the message;
  when receiving the sparsely populated bitmap, a receiver can work through the encoded bit map and encoded data in sequence where the presence of a 1-bit in the bit map conveys the index of the dictionary entry and the technique for decoding the subsequent bytes in the data portion of the encoded message.

20. The computer readable medium of claim 18, wherein each destination relays messages relating to one or more dynamic data streams, wherein each dynamic data stream conforms to one of a plurality of possible combinations of fields.

21. The computer readable medium of claim 20, wherein for each unique combination of fields the server generates a dictionary and assigns an id.

22. The computer readable medium of claim 21, wherein the sender sends to the client only those dictionaries that are required on an as-needed basis before sending any encoded message that rely on the dictionary.

23. A computer implemented method for providing a Java Message Server (JMS), the method comprising:
- a plurality of plug-ins, each plug-in corresponding to one of a plurality of JMS session providers;
- receiving a first request from a JMS client to establish a JMS session, wherein the first request comprises an application context name; and
- in response to the first request, analyzing names of the plurality of JMS session providers to match the application context name and to establish the JMS session;
- wherein the established JMS session has a configured JMS destination provider to which it delegates servicing of subsequent destination publish-subscribe requests.

24. The method of claim 23, wherein the configured JMS destination provider delegates the servicing of destination publish-subscribe requests to one of a plurality of configured second JMS destination providers sorted according to destination name filters, further comprising:
- receiving via the established JMS session, one or more second requests from the JMS client to access one of the second JMS destination providers for the JMS session; and
- analyzing the sorted JMS destination providers to find a matched second JMS destination provider that gives the best match for the requested destination name.

25. The method of claim 24, wherein the sorted JMS destination providers comprises a sorted sequence with JMS destination providers having a specific filter listed before JMS destination providers having a generalized filter.

26. The method of claim 24, wherein the matched JMS destination provider implements an application-level messaging protocol interaction with a JMS client application.

27. The method of claim 26, wherein the application-level messaging protocol comprises processing subscription requests, processing publication requests, and generating or routing messages to and from the JMS client application.

28. The method of claim 24, wherein the matched second JMS destination provider provides publish-subscribe access to one or more streams of dynamic data, where the access comprises interaction with locally cached data or interaction with external systems in conjunction with message transformations.

29. The method of claim 28, wherein the matched second JMS destination provider uses a dictionary to optimize JMS MapMessages relating to one or more streams of dynamic data conveyed over a single destination.

30. The method of claim 29, wherein the dictionary provides message optimization comprising:
- for each field that may be present in a JMS MapMessage, the field is assigned an index starting from zero;
- the dictionary describes the number of fields and the name and type of each field;
- when JMS MapMessages are sent, the encoded map message data is preceded by a variable length bitmap indicating which fields are present in the message;
- when the bitmap is encoded it comprises a minimal size to accommodate the largest index for fields actually present in the message;
- when full image messages are sent, all bits in the bitmap are fully populated;
- when update messages are sent, the bitmap is sparsely populated, having bits set to 1 only for those indices corresponding to fields in the message;
- when receiving the sparsely populated bitmap, a receiver can work through the encoded bit map and encoded data in sequence where the presence of a 1-bit in the bit map conveys the index of the dictionary entry and the technique for decoding the subsequent bytes in the data portion of the encoded message.

31. The method of claim 24, wherein each destination relays messages relating to one or more dynamic data streams, wherein each dynamic data stream conforms to one of a plurality of possible combinations of fields.

32. The method of claim 31, wherein for each unique combination of fields the server generates a dictionary and assigns an id.

33. The method of claim 32, wherein the sender sends to the client only those dictionaries that are required on an as-needed basis before sending any encoded message that rely on the dictionary.

* * * * *